(12) United States Patent
Nobue et al.

(10) Patent No.: US 9,398,646 B2
(45) Date of Patent: Jul. 19, 2016

(54) MICROWAVE HEATING DEVICE AND MICROWAVE HEATING CONTROL METHOD

(75) Inventors: Tomotaka Nobue, Kyoto (JP); Yoshiharu Oomori, Shiga (JP); Kenji Yasui, Shiga (JP); Makoto Mihara, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 870 days.

(21) Appl. No.: 13/382,760

(22) PCT Filed: Jun. 28, 2010

(86) PCT No.: PCT/JP2010/004251
§ 371 (c)(1),
(2), (4) Date: Jan. 6, 2012

(87) PCT Pub. No.: WO2011/004561
PCT Pub. Date: Jan. 13, 2011

(65) Prior Publication Data
US 2012/0111856 A1 May 10, 2012

(30) Foreign Application Priority Data
Jul. 10, 2009 (JP) ................... 2009-163544

(51) Int. Cl.
*H05B 6/50* (2006.01)
*H05B 6/66* (2006.01)
(Continued)

(52) U.S. Cl.
CPC ........... *H05B 6/686* (2013.01); *H05B 6/70* (2013.01); *H05B 6/705* (2013.01); *H05B 6/72* (2013.01); *H05B 2206/044* (2013.01); *Y02B 40/143* (2013.01); *Y02B 40/146* (2013.01)

(58) Field of Classification Search
CPC ........ H05B 6/705; H05B 6/68; H05B 6/6447; H05B 6/686; H05B 6/70; H05B 6/72; H05B 2206/044; Y02B 40/146; Y02B 40/143
USPC .................................. 219/702–721
See application file for complete search history.

(56) References Cited

U.S. PATENT DOCUMENTS 3,439,431 A * 4/1969 Heidtmann ............... 34/261
3,670,133 A * 6/1972 Admiraal ................. 219/693
(Continued)

FOREIGN PATENT DOCUMENTS

| EP | 2051564 A1 | 4/2009 |
| JP | 55-049632 A | 4/1980 |

(Continued)

OTHER PUBLICATIONS

International Preliminary Report on Patentability for International Application No. PCT/JP2010/004251, dated Feb. 14, 2012, 7 pages.
(Continued)

*Primary Examiner* — Eric Stapleton
(74) *Attorney, Agent, or Firm* — Brinks Gilson & Lione

(57) ABSTRACT

In order to provide a microwave heating device and a microwave heating control method which are capable of uniformly heating a to-be-heated object in a desired state, by employing plural feeding portions provided in a heating chamber on the basis of information about reflected electric power from the respective feeding portions; a control portion controls to supply microwave electric power from plural feeding portions to a heating chamber by operating a microwave generating portion at a heating frequency for heating a to-be-heated object, estimates a heating state for the to-be-heated object on the basis of per-unit-time increase/decrease change states of detected levels of detection signals detected by electric-power detection portions, and controls the heating frequency and the microwave electric power supplied from the feeding portions to the heating chamber.

6 Claims, 19 Drawing Sheets

(51) Int. Cl.
*H05B 6/68* (2006.01)
*H05B 6/70* (2006.01)
*H05B 6/72* (2006.01)

(56) References Cited

U.S. PATENT DOCUMENTS

| | | | | |
|---|---|---|---|---|
| 4,191,876 A * | 3/1980 | Ohkubo et al. | | 219/711 |
| 4,210,795 A * | 7/1980 | Lentz | | 219/709 |
| 4,245,143 A * | 1/1981 | Miura et al. | | 219/711 |
| 4,286,134 A * | 8/1981 | Nakata et al. | | 219/711 |
| 4,415,789 A * | 11/1983 | Nobue et al. | | 219/709 |
| 4,434,342 A * | 2/1984 | Schubring | | 219/710 |
| 4,507,530 A * | 3/1985 | Smith | | 219/709 |
| 4,616,120 A * | 10/1986 | Maruyama et al. | | 219/696 |
| 4,714,812 A * | 12/1987 | Haagensen et al. | | 219/697 |
| 4,727,231 A * | 2/1988 | Hayano et al. | | 219/709 |
| 4,741,348 A * | 5/1988 | Kikuchi et al. | | 607/102 |
| 4,744,372 A * | 5/1988 | Kikuchi et al. | | 607/102 |
| 4,771,153 A * | 9/1988 | Fukushima et al. | | 219/709 |
| 4,795,871 A * | 1/1989 | Strattan et al. | | 219/707 |
| 4,814,570 A * | 3/1989 | Takizaki | | 219/705 |
| 4,816,635 A * | 3/1989 | Edamura | | 219/714 |
| 4,816,986 A * | 3/1989 | Spiridonov et al. | | 363/132 |
| 4,831,225 A * | 5/1989 | Ishifuro et al. | | 219/681 |
| 4,831,227 A * | 5/1989 | Eke | | 219/681 |
| 4,831,239 A * | 5/1989 | Ueda | | 219/518 |
| 4,833,284 A * | 5/1989 | Park | | 219/709 |
| 4,833,304 A * | 5/1989 | Ueda | | 219/518 |
| 4,841,111 A * | 6/1989 | Kokkeler et al. | | 219/703 |
| 5,179,264 A * | 1/1993 | Cuomo et al. | | 219/121.43 |
| 5,321,222 A * | 6/1994 | Bible et al. | | 219/709 |
| 5,347,108 A * | 9/1994 | Minakawa et al. | | 219/696 |
| 5,378,875 A * | 1/1995 | Hirama et al. | | 219/705 |
| 5,521,360 A * | 5/1996 | Johnson et al. | | 219/709 |
| 5,693,247 A * | 12/1997 | Bu et al. | | 219/711 |
| 5,695,672 A * | 12/1997 | Kim | | 219/709 |
| 5,721,286 A * | 2/1998 | Lauf et al. | | 522/1 |
| 5,756,975 A * | 5/1998 | Harris et al. | | 219/696 |
| 5,793,025 A * | 8/1998 | Niimi et al. | | 219/709 |
| 5,798,395 A * | 8/1998 | Lauf et al. | | 522/1 |
| 5,804,801 A * | 9/1998 | Lauf et al. | | 219/759 |
| 5,828,042 A * | 10/1998 | Choi et al. | | 219/705 |
| 5,869,817 A * | 2/1999 | Zietlow et al. | | 219/696 |
| 5,961,871 A * | 10/1999 | Bible et al. | | 219/709 |
| 6,097,019 A * | 8/2000 | Lewis et al. | | 219/750 |
| 6,132,084 A * | 10/2000 | Whipple et al. | | 374/131 |
| 6,150,645 A * | 11/2000 | Lewis et al. | | 219/715 |
| 6,157,015 A * | 12/2000 | Gaisford et al. | | 219/748 |
| 6,166,362 A * | 12/2000 | Shon et al. | | 219/702 |
| 6,166,363 A * | 12/2000 | Shon et al. | | 219/703 |
| 6,222,170 B1 * | 4/2001 | Tucker et al. | | 219/748 |
| 6,242,726 B1 * | 6/2001 | Harris et al. | | 219/764 |
| 6,259,078 B1 * | 7/2001 | Araya | | 219/709 |
| 6,268,597 B1 * | 7/2001 | Shon et al. | | 219/709 |
| 6,271,538 B2 * | 8/2001 | Niimi et al. | | 257/43 |
| 6,403,939 B1 * | 6/2002 | Fagrell | | 219/709 |
| 6,452,141 B1 * | 9/2002 | Shon | | 219/709 |
| 6,469,286 B1 * | 10/2002 | Nobue et al. | | 219/746 |
| 6,884,979 B1 * | 4/2005 | Törngren et al. | | 219/746 |
| 7,087,874 B2 * | 8/2006 | Ishikawa et al. | | 219/701 |
| 2001/0000403 A1 * | 4/2001 | Gaisford et al. | | 219/748 |
| 2002/0027135 A1 * | 3/2002 | Fagrell et al. | | 219/690 |
| 2004/0001295 A1 * | 1/2004 | Kumar et al. | | 361/115 |
| 2005/0236404 A1 * | 10/2005 | Tsuji | | 219/709 |
| 2006/0081624 A1 * | 4/2006 | Takada et al. | | 219/716 |
| 2006/0155270 A1 * | 7/2006 | Hancock et al. | | 606/33 |
| 2007/0039949 A1 * | 2/2007 | Wilson | | 219/679 |
| 2007/0108195 A1 * | 5/2007 | Tian et al. | | 219/702 |
| 2009/0212046 A1 * | 8/2009 | Tabuse | | 219/702 |
| 2010/0107435 A1 * | 5/2010 | George et al. | | 34/259 |
| 2010/0176121 A1 * | 7/2010 | Nobue et al. | | 219/716 |
| 2010/0176123 A1 * | 7/2010 | Mihara et al. | | 219/746 |
| 2010/0187224 A1 * | 7/2010 | Hyde et al. | | 219/720 |

FOREIGN PATENT DOCUMENTS

| | | |
|---|---|---|
| JP | 56-159087 A | 12/1981 |
| JP | 04-245190 A | 9/1992 |
| JP | 05-041279 A | 2/1993 |
| WO | WO 2009/050893 A1 | 4/2009 |

OTHER PUBLICATIONS

Extended European Search Report for European Application No. 10796875.2, dated Apr. 16, 2012, 7 pages.

International Search Report for International Application No. PCT/JP2010/004251, dated Sep. 28, 2010, 1 page.

* cited by examiner

MICROWAVE HEATING DEVICE AND MICROWAVE HEATING CONTROL METHOD

This application is a 371 application of PCT/JP2010/004251 having an international filing date of Jun. 28, 2010, which claims priority to JP2009-163544 filed Jul. 10, 2009, the entire contents of which are incorporated herein by reference.

TECHNICAL FIELD

The present invention relates to microwave heating devices and microwave heating control methods for performing heating processing on objects to be heated using microwave generating means having variable frequency functions.

BACKGROUND ART

Conventional microwave heating devices have generally employed vacuum tubes called magnetrons, serving as microwave generating means, as represented by microwave ovens.

Magnetrons employed in the microwave ovens are configured such that oscillating frequencies are determined by their own configurations while these determined frequencies are not allowed to be variably adjusted on purpose. There have been existing techniques for providing such magnetrons with variable frequency functions, but such magnetrons provided with these techniques are expensive, which makes it hard to incorporate them into products for the general-public.

Along with progresses of semiconductor techniques in recent years, as microwave generating means comparable to the performance of magnetrons or overwhelming the performance of magnetrons, those employing semiconductor devices have been put into practical use. Such microwave generating means employing semiconductor devices have a function of easily varying the frequency of microwaves, for corresponding to a wider frequency range.

When an object to be heated (a to-be-heated object) is housed within the heating chamber in a microwave heating device and is being subjected to microwave heating processing thereby, the to-be-heated object changes its properties along with the heating processing. Accordingly, microwaves supplied to the heating chamber which houses the to-be-heated object are absorbed by the to-be-heated object, to varying degrees, which induces a reflection phenomenon that the microwaves are reflected back toward the microwave generating means from the heating chamber. Such a reflection phenomenon induces reflected electric power, and this reflected electric power is thermally consumed by semiconductor devices, thereby inducing thermal destructions of these semiconductor devices. Accordingly, in cases of microwave generating means employing semiconductor devices, it is an important challenge to control the reflected electric power, in view of preventing thermal destructions of semiconductor devices due to the reflected electric power.

There has been a microwave heating device disclosed in Patent Literature 1, as an apparatus adapted to control a microwave generating means by detecting changes in reflected electric power. This conventional microwave generating device disclosed in Patent Literature 1 employs a magnetron as a microwave generating means and is adapted to perform control for detecting components in the directions of incidence and reflection, out of high-frequency electric power transmitted to the inside of a waveguide which couples the magnetron and a heating chamber, and for stopping heating processing when reflected electric power, out of the detected components in these directions, has prominently changed along with progresses of heating.

Further, there is disclosed in Patent Literature 2, for example, a configuration which provides a sensor for determining incident electric power supplied to a heating chamber and for determining reflected electric power and, further, provides means for detecting microwave levels within the heating chamber, in a conventional microwave heating device employing a magnetron as a microwave generating means. This conventional microwave heating device disclosed in Patent Literature 2 is adapted to determine the thermal capacities of to-be-heated objects based on the incident electric power, the reflected electric power and detection signals indicative of microwave levels within the heating chamber and to control the electric power generated from the microwave generating means as the magnetron.

CITATION LIST

Patent Literatures

PLT 1: Unexamined Japanese Patent Publication No. 04-245190

PLT 2: Unexamined Japanese Patent Publication No. 55-049632

SUMMARY OF INVENTION

Technical Problem

Since conventional microwave generating devices have employed magnetrons as microwave generating means, there has been a need for providing particular mechanisms for adjusting and controlling the frequency of generated microwaves, thereby inducing the problem of increases of the apparatus sizes and the fabrication costs. Further, conventional microwave heating devices have been configured to detect reflected electric power at a portion of the heating chamber, and therefore, have not been able to acquire information about the heating distribution in to-be-heated objects from the detected reflected electric power. This has made it impossible to utilize the detected reflected electric power, for performing control for preferably heating entire to-be-heated objects.

It is an object of the present invention to provide a microwave heating device and a microwave heating control method, which are capable of uniformly heating a to-be-heated object in a desired state, by employing plural feeding portions provided in a heating chamber, based on information about reflected electric power from the respective feeding portions.

Solution to Problem

In order to overcome the problems in conventional microwave heating devices, a microwave heating device in a first aspect of the present invention includes:

a microwave generating portion having a variable frequency function;

a heating chamber for housing an object to be heated;

plural feeding portions for supplying, to the heating chamber, a microwave generated from the microwave generating portion;

an electric-power detection portion for detecting an amount of reflected microwaves which are reflected toward the microwave generating portion from the heating chamber through the feeding portions; and a control portion for controlling an operation of the microwave generating portion on the basis of a detection signal detected by the electric-power detection portion; wherein the control portion is configured to perform control for operating the microwave generating portion at a heating frequency for heating the object to be heated for supplying microwave electric power from the feeding potions to the heating chamber, estimate a heating state of the object to be heated on the basis of a per-unit-time increase/decrease change state in a detected level of the detection signal detected by the electric-power detection portion, and control the heating frequency and the microwave electric power supplied from the feeding portions to the heating chamber.

With the microwave heating device having the configuration as described in the first aspect, it is possible to uniformly heat an object to be heated in a desired state on the basis of information about reflected electric power from the plural feeding portions.

In a second aspect of the present invention, in the microwave heating device in the first aspect, the microwave heating device is configured that a heating-distribution state of the object to be heated is estimated on the basis of a per-unit-time increase/decrease change state of at least a single amount of reflected microwaves from the electric-power detection portion, and a heating state of the object to be heated is estimated on the basis of per-unit-time increase/decrease change states of all the amounts of reflected microwaves from the electric-power detection portion, whereby the heating frequency and the microwave electric power supplied from the feeding portions to the heating chamber are controlled.

With the microwave heating device having the configuration as described in the second aspect, when the amounts of reflected microwaves acquired from the electric-power detection portion associated with the respective plural feeding portions are detected in terms of their temporal increase/decrease changes, if any one of the amounts of reflected microwaves is detected as being different from the other amounts of reflected microwaves in terms of its temporal increase/decrease change, it is estimated that the object to be heated is in a nonuniformly-heated state, and the oscillating frequency of the microwave generating portion is updated, for facilitating uniform heating of the object to be heated.

Further, with the microwave heating device in the second aspect, the heating state of the object to be heated is estimated on the basis of temporal increase/decrease changes in the amounts of reflected microwaves, and the timing of the completion of the operation of the microwave generating portion is determined, and when the timing has been reached, the operation is stopped, which can suppress excessive heating, thereby attaining preferable heating finishing.

In a third aspect of the present invention, in the microwave heating device in the second aspect, the control portion is configured to perform control for causing the microwave generating portion to perform a sweeping operation in a predetermined frequency range, prior to the start of an actual heating operation on the object to be heated, for selecting, as a heating frequency, an oscillating frequency at which a total sum of the amounts of the reflected microwaves have a minimum value, and for causing the microwave generating portion to operate at the heating frequency for supplying microwave electric power from the feeding portions to the heating chamber.

With the microwave heating device having the configuration as described above in the third aspect, it is possible to certainly reduce the amounts of the reflected microwaves, thereby providing a heating apparatus with higher reliability.

In a fourth aspect of the present invention, in the microwave heating device in aforementioned second aspect, the control portion is configured to perform control for causing the microwave generating portion to perform a sweeping operation in a predetermined frequency range, prior to the start of an actual heating operation on the object to be heated, for selecting, as a heating frequency, an oscillating frequency at which the reflection ratio of a total sum of the amounts of reflected microwaves to a total sum of the amounts of supplied microwaves has a minimum value, and for causing the microwave generating portion to operate at the heating frequency for supplying microwave electric power from the feeding portions to the heating chamber.

With the microwave heating device having the configuration as described above in the fourth aspect, it is possible to certainly reduce the amounts of reflected microwaves, thereby providing a heating apparatus with higher reliability.

Further, the microwave heating device in the fourth aspect is adapted to detect an amount of supplied microwaves with the electric-power detection portion, and also is adapted to utilize this detected amount of supplied microwaves, which enables correction in the change of the amount of supplied microwaves, in the case where the oscillating frequency generated from the microwave generating portion has been changed through updating processing and the like. This enables estimation of, more certainly, the state change in the object to be heated along with heating.

In a fifth aspect of the present invention, in the microwave heating device in the second or third aspect, the respective feeding portions may be placed on the same wall surface forming the heating chamber, symmetrically about a center of this wall surface. With the microwave heating device having the configuration as described in the fifth aspect, microwaves can be radiated, in different directions, from the plural feeding portions placed symmetrically about a point, for the object to be heated placed at the center of the heating chamber, and also the feeding portions are enabled to receive reflected waves in different directions. The microwave heating device having the configuration as described above in the fifth aspect is adapted to make comparisons among the amounts of reflected microwaves received by the respective feeding portions, which enables certainly grasp of the uniformity of the heating of the object to be heated, thereby enabling estimation of the degree of uniformity of the heating with higher accuracy.

In a sixth aspect of the present invention, in the microwave heating device in the second or third aspect, the control portion may be configured to select a heating frequency again, when any of plural amounts of reflected microwaves from the electric-power detection portion has exceeded a preset predetermined value. With the microwave heating device having the configuration as described above in the sixth aspect, it is possible to certainly suppress thermal destructions of the components in the microwave generating portion due to microwave electric power reflected toward the microwave generating portion, and also it is possible to maximize the amount of microwave electric power supplied to the object to be heated, thereby reducing the time period and the electric power required for heating.

In a seventh aspect of the present invention, in the microwave heating device in the second or third aspect, when the control portion estimates a heating state of the object to be heated on the basis of per-unit-time increase/decrease change states of plural amounts of reflected microwaves from the electric-power detection portion, the control portion may be configured to select a heating frequency again, when at least a single amount of reflected microwave has a different tendency from others in terms of its increase/decrease change state. With the microwave heating device having the configuration as described above in the seventh aspect, it is possible to certainly estimate the uniformity of the heating distribution for the object to be heated.

In an eighth aspect of the present invention, in the microwave heating device in the second or third aspect, when the control portion estimates a heating state of the object to be heated on the basis of per-unit-time increase/decrease change states of all the amounts of reflected microwaves from the electric-power detection portion, the control portion may be configured to continue an actual heating operation, when all the amounts of reflected microwaves have the same tendency, in terms of their increase/decrease change states. With the microwave heating device having the configuration as described above in the eighth aspect, it is possible to recognize the uniformity of heating of the object to be heated, and also it is possible to certainly estimation of the changes of physical characteristics of the entire object to be heated.

In a ninth aspect of the present invention, in the microwave heating device in the second or third aspect, when the control portion estimates a heating state of the object to be heated on the basis of per-unit-time increase/decrease change states of all the amounts of reflected microwaves from the electric-power detection portion, the control portion may be configured to estimate that the temperature of the object to be heated falls within the range of 60° C. to 70° C., and also calculate a completion time of an actual heating operation, when all the amounts of reflected microwaves have the same tendency in terms of their increase/decrease change states and, also, the detected level of the increase/decrease change state of at least a single amount of reflected microwaves has exceeded a threshold value as a determination index.

With the microwave heating device having the configuration as described above in the ninth aspect, it is possible to recognize that the heating of the object to be heated has been nearing to the end. If the temperature of the object to be heated reaches this temperature range (60° C. to 70° C.) within which water vaporization begins to actively occur, microwaves intrude into the object to be heated to a larger depth and, when the object to be heated has a smaller size, these microwaves begin to penetrate through the object to be heated, and when the object to be heated has a larger size, these microwaves are less reflected by the surface of the object to be heated. In such states, each feeding portion directly receives, at a higher rate, microwaves radiated from the other feeding portions, and the reflection thereof on the surface of the object to be heated is reduced, thereby decreasing the reflections received by the respective feeding portions. Accordingly, at the timing when the amounts of reflected microwaves detected by the respective electric-power detection portions prominently have the same tendency in terms of their increase/decrease change states, it can be clearly estimated that the temperature falls within this temperature range (60° C. to 70° C.).

In a tenth aspect of the present invention, in the microwave heating device in the second or third aspect, the control portion may be configured to perform control for causing the microwave generating portion to operate at a heating frequency selected prior to an actual heating operation on the object to be heated for supplying microwave electric power from the feeding portions to the heating chamber, further to perform the sweeping operation again, for selecting an oscillating frequency for heating the object to be heated, antecedently to the estimation of the heating state and the heating-distribution state of the object to be heated when an amount of reflected microwaves has exceeded a predetermined value, and to update the heating frequency for the object to be heated to the selected oscillating frequency for heating the object to be heated. With the microwave heating device having the configuration as described above in the tenth aspect, it is possible to suppress thermal destructions of the components in the microwave generating portion due to microwave electric power reflected toward the microwave generating portion, and also it is possible to maximize the amount of microwave electric power supplied to the object to be heated, thereby reducing the time period and the electric power required for heating.

A microwave heating control method in an eleventh aspect of the present invention includes the steps of:

performing a sweeping operation over a predetermined frequency range, and detecting an amount of reflected microwaves reflected toward a microwave generating portion from a heating chamber through plural feeding portions, prior to the start of an actual heating operation on an object to be heated housed in the heating chamber;

selecting, as a heating frequency, an oscillating frequency at which a detected level of a total sum of detected amounts of reflected microwaves has a minimum value; and estimating a heating state of the object to be heated on the basis of a per-unit-time increase/decrease change state of a detected level of an amount of reflected microwaves, and controlling the heating frequency and the microwave electric power supplied to the heating chamber from the feeding portions, in a state where microwave electric power is supplied from the feeding portions to the heating chamber at the selected frequency.

With the microwave heating control method having the configuration as described above in the eleventh aspect, it is possible to uniformly heat the object to be heated in a desired state on the basis of information about reflected electric power from the plural feeding portions.

In a twelfth aspect of the present invention, the microwave heating control method in the eleventh aspect may include the steps of: estimating a heating-distribution state of the object to be heated on the basis of a per-unit-time increase/decrease change state of at least a single detected amount of reflected microwave, estimating a heating state of the object to be heated on the basis of per-unit-time increase/decrease change states of all the amounts of reflected microwaves, and controlling the heating frequency and the microwave electric power supplied from the feeding portions to the heating chamber.

With the microwave heating control method having the configuration as described above in the twelfth aspect, when the amounts of reflected microwaves acquired from the electric-power detection portion associated with the respective plural feeding portions are detected in terms of their temporal increase/decrease changes, if any one of the amounts of reflected microwaves is detected as being different from the other amounts of reflected microwaves in terms of its temporal increase/decrease change, it can be estimated that the object to be heated is in a nonuniformly-heated state, and the oscillating frequency of the microwave generating portion is updated, for facilitating uniform heating of the object to be heated. Further, with the microwave heating control method in the twelfth aspect, the heating state for the object to be heated is estimated based on temporal increase/decrease changes in the amounts of reflected microwaves, and the timing of the completion of the operation of the microwave generating portion is determined, and when the timing has been reached, the operation is stopped, which can suppress excessive heating, thereby attaining preferable heating finishing.

In a thirteenth aspect of the present invention, in the microwave heating control method in the eleventh aspect, the heating-frequency selection step may include selecting, as a heating frequency, an oscillating frequency at which the reflection ratio of a total sum of amounts of reflected microwaves to a total sum of amounts of supplied microwaves has a minimum value. With the microwave heating control method having the configuration as described above in the twelfth aspect, it is possible to certainly reduce the amount of reflected microwaves, thereby providing a heating apparatus with higher reliability.

In a fourteenth aspect of the present invention, in the microwave heating control method in the eleventh or twelfth aspect, a heating frequency may be selected again, when any of plural detected amounts of reflected microwaves has exceeded a preset predetermined value. With the microwave heating control method having the configuration as described above in the fourteenth aspect, it is possible to certainly suppress thermal destructions of the components in the microwave generating portion due to microwave electric power reflected toward the microwave generating portion, and also it is possible to maximize the amount of microwave electric power supplied to the object to be heated, thereby reducing the time period and the electric power required for heating.

In a fifteenth aspect of the present invention, in the microwave heating control method in the eleventh or twelfth aspect, when a heating state of the object to be heated is estimated on the basis of per-unit-time increase/decrease change states of plural detected amounts of reflected microwaves, a heating frequency may be selected again, when at least a single amount of reflected microwave has a different tendency from others in terms of its increase/decrease change state. With the microwave heating control method having the configuration as described above in the fifteenth aspect, it is possible to certainly estimate the uniformity of the heating distribution for the object to be heated.

In a sixteenth aspect of the present invention, in the microwave heating control method in the eleventh or twelfth aspect, when a heating state of the object to be heated is estimated on the basis of per-unit-time increase/decrease change states of all the detected amounts of reflected microwaves, an actual heating operation may be continued, when all the amounts of reflected microwaves have the same tendency, in terms of their increase/decrease change states. With the microwave heating control method having the configuration as described above in the sixteenth aspect, it is possible to recognize the uniformity of heating of the object to be heated, and also it is possible to certainly estimate the changes of physical characteristics of the entire object to be heated.

In a seventeenth aspect of the present invention, in the microwave heating control method in the eleventh or twelfth aspect, in an actual heating operation for operating at a heating frequency selected prior to the start of the actual heating operation on the object to be heated for supplying microwave electric power from the feeding portions to the heating chamber, when an amount of reflected microwaves has exceeded a predetermined value, the sweeping operation may be performed again, for selecting an oscillating frequency for heating the object to be heated, antecedently to the estimation of the heating state and the heating-distribution state for the object to be heated, and the heating frequency for the object to be heated may be updated to the selected oscillating frequency for heating the object to be heated. With the microwave heating control method having the configuration as described above in the seventeenth aspect, it is possible to suppress thermal destructions of the components in the microwave generating portion due to microwave electric power reflected toward the microwave generating portion, and also it is possible to maximize the amount of microwave electric power supplied to the object to be heated, thereby reducing the time period and the electric power required for heating.

Advantageous Effects of the Invention

With the microwave heating device and the microwave heating control method according to the present invention, it is possible to uniformly heat an object to be heated in a desired state on the basis of at least information about reflected electric power from each of plural feeding portions provided in a heating chamber.

DETAILED DESCRIPTION OF THE PREFERRED EMBODIMENTS

Hereinafter, with reference to the accompanying drawings, there will be described microwave ovens, as embodiments of a microwave heating device and a microwave heating control method according to the present invention. Further, the microwave heating device according to the present invention is not limited to the configurations of microwave ovens which will be described in the following embodiments and is intended to include microwave heating devices and microwave heating control methods configured based on technical ideas equivalent to the technical ideas which will be described in the following embodiments and based on technical common senses in the present technical field.

(Embodiment 1)

Figure 1:
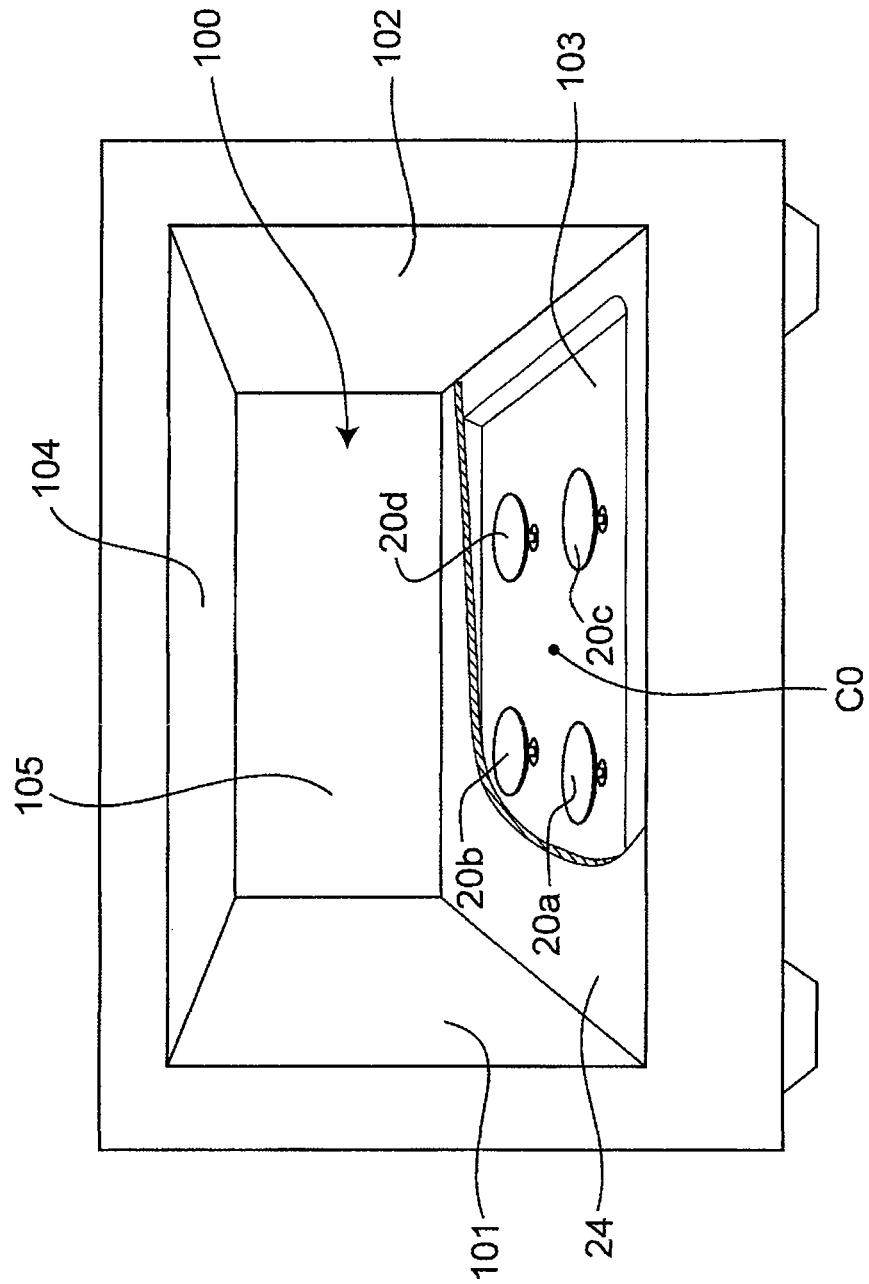
FIG. 1 is a partially-cutout view illustrating the inside of a heating chamber in a microwave heating device according to Embodiment 1 of the present invention.
Figure 2:
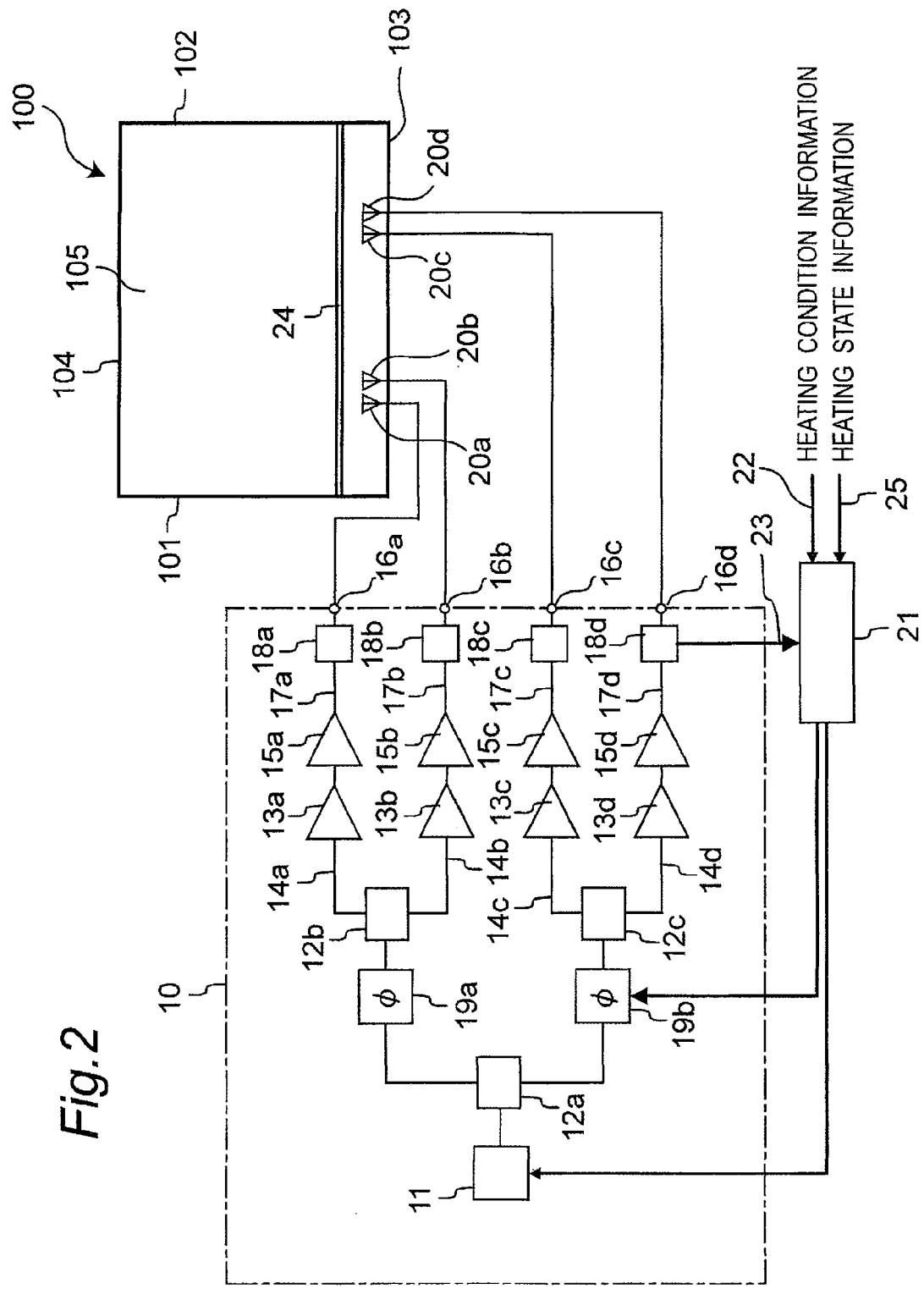
FIG. 2 is a block diagram illustrating the configuration of the microwave heating device according to Embodiment 1 of the present invention.
Figure 3:
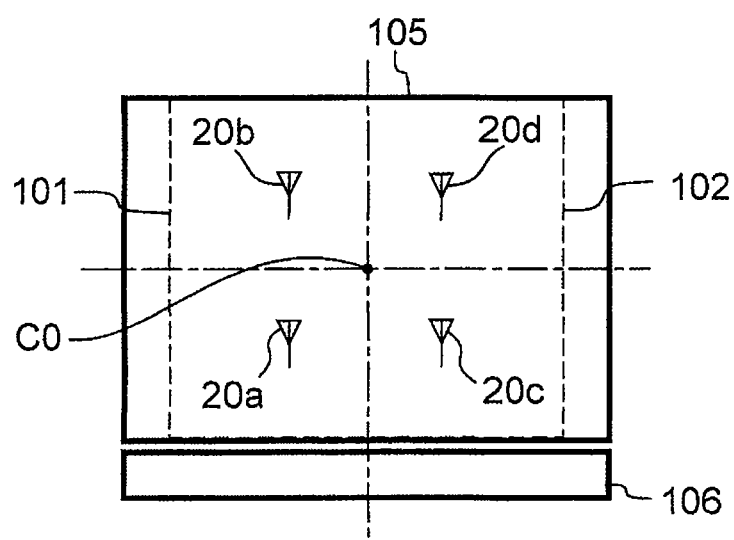
FIG. 3 is a view illustrating the configuration of plural feeding portions provided on a bottom wall surface of the heating chamber in the microwave heating device according to Embodiment 1 of the present invention.

FIG. 1 is a partially-cutout view illustrating the inside of a heating chamber in a microwave heating device according to Embodiment 1 of the present invention. Referring to FIG. 1, there is provided an openable door for opening and closing the heating chamber at its front-surface side, but this openable door is not illustrated therein. FIG. 2 is a block diagram illustrating the configuration of the microwave heating device according to Embodiment 1 of the present invention. FIG. 3 is a view illustrating the configurations of plural feeding portions provided on a bottom wall surface of the heating chamber in the microwave heating device according to Embodiment 1 of the present invention.

[Configuration of Microwave Heating Apparatus]

The microwave heating device according to Embodiment 1 includes a heating chamber 100 having a substantially rectangular-parallelepiped configuration for housing an object to be heated (a to-be-heated object) therein. The heating chamber 100 includes a left wall surface 101, a right wall surface 102, a bottom wall surface 103, an upper wall surface 104 and a back wall surface 105 which are made of a metal material, and includes an openable door 106 (see FIG. 3) adapted to be opened and closed for housing a to-be-heated object therein, so that the heating chamber 100 is configured to enclose, inside thereof, microwaves supplied thereto. Further, on the bottom wall surface 103 which forms the heating chamber 100, there are placed four feeding portions 20a, 20b, 20c and 20d for radiating and supplying, to the inside of the heating chamber 100, microwaves created by a microwave generating portion 10 (see FIG. 2) as a microwave generating means. These feeding portions 20a, 20b, 20c and 20d are placed on the bottom wall surface 103 such that they are symmetrical about an approximate center C0 of the bottom surface 103 (see FIG. 3).

As illustrated in FIG. 2, the microwave heating device according to Embodiment 1 includes the heating chamber 100 surrounded by a cabinet, the microwave generating portion 10 for supplying microwave electric power to the inside of the heating chamber, a control portion 21, and the feeding portions 20a, 20b, 20c and 20d. The microwave generating portion 10 is configured to include an oscillation portion 11 constituted by semiconductor devices, electric-power dividing portions 12a, 12b and 12c for dividing the output of the oscillation portion 11 into four parts with a two-stage configuration, amplification portions 13a, 13b, 13c, 13d, 15a, 15b, 15c and 15d for amplifying the electric power resulted from the division, electric-power detection portions 18a, 18b, 18c and 18d, and variable phase portions 19a and 19b. There is provided a two-stage configuration which divides the output of the oscillation portion 11 into two parts by the initial-stage electric-power dividing portion 12a and, further, divides them into four parts by the next-stage electric-power dividing portions 12b and 12c. The variable phase portions 19a and 19b are provided between the output of the initial-stage electric-power dividing portion 12a and the inputs of the next-stage electric-power dividing portions 12b and 12c, respectively.

The four outputs resulted from the division by the next-stage electric-power dividing portions 12b and 12c are led to the initial-stage amplification portions 13a, 13b, 13c and 13d which are constituted by semiconductor devices, through microwave transmission paths 14a, 14b, 14c and 14d, respectively. The respective outputs from the initial-stage amplification portions 13a, 13b, 13c and 13d are further amplified by the main amplification portions 15a, 15b, 15c and 15d which are constituted by semiconductor devices, respectively. The respective outputs from the main amplification portions 15a, 15b, 15c and 15d are led to output portions 16a, 16b, 16c and 16d in the microwave generating portion 10, through microwave transmission paths 17a, 17b, 17c and 17d, respectively. The electric-power detection portions 18a, 18b, 18c and 18d are inserted into the microwave transmission paths 17a, 17b, 17c and 17d, respectively.

Further, the microwave heating device according to Embodiment 1 will be described as having a configuration in which the electric-power detection portions 18a, 18b, 18c and 18d are provided inside the microwave generating portion 10. However, the present invention is not limited to the configuration, and the electric-power detection portions 18a, 18b, 18c and 18d may be configured to be independent of the microwave generating portion 10 and may be configured to be provided between the microwave generating portion 10 and the respective feeding portions 20a, 20b, 20c and 20d.

The microwave generating portion 10 is formed on a dielectric substrate made of a low dielectric loss material. The initial-stage amplification portions 13a, 13b, 13c and 13d and the main amplification portions 15a, 15b, 15c and 15d are formed from circuits in conductive patterns formed on a single surface of the dielectric substrate, wherein, in order to preferably operate the semiconductor devices constituting the amplification devices in the respective amplification portions, each of the semiconductor devices is provided with matching circuits at the input and output sides thereof.

The microwave transmission paths 14a, 14b, 14c and 14d and 17a, 17b, 17c and 17d are formed from transmission circuits with characteristic impedances of about 50 ohm, in conductive patterns provided on a single surface of the dielectric substrate.

The oscillation portion 11 in the microwave generating portion 10 has a variable frequency function for generating frequencies in the range of 2400 MHz to 2500 MHz.

The electric-power dividing portions 12a, 12b and 12c each have a Wilkinson-type electric-power two-division configuration. By employing this configuration, the microwaves transmitted to the input terminals of the initial-stage amplification portions 13a, 13b, 13c and 13d ideally have the same phase.

The variable phase portions 19a and 19b which are provided between the initial-stage electric-power dividing portion 12a and the next-stage electric-power dividing portions 12b and 12c, respectively, are formed to be reflection-type phase circuits having a circuit configuration in which a variable capacitance diode is incorporated. The reflection-type phase circuits are configured to induce a phase delay, if the voltage applied to the variable capacitance diode is varied. The reflection-type phase circuits are provided by selecting the variable capacitance diode and by setting the applied-voltage variation range, such that phase delays of up to 180 degrees or more can be induced by varying the voltage applied to the variable capacitance diode, with respect to transmission of a center frequency within a frequency range used in the microwave heating device. By controlling the variable phase portions 19a and 19b, it is possible to vary, up to 360 degrees, the phase difference between the first output portions 16a and 16b and the second output portions 16c and 16d in the microwave generating portion 10.

Further, the electric-power detection portions 18a, 18b, 18c and 18d are adapted to detect microwave electric power (hereinafter, referred to as the amounts of supplied microwaves) transmitted to the heating chamber 100 from the microwave generating portion 10 through the feeding portions 20a, 20b, 20c and 20d, and are adapted to detect electric power of so-called reflected waves (hereinafter, referred to as the amounts of reflected microwaves) which are transmitted from the heating chamber 100 to the microwave generating portion 10 through the feeding portions 20a, 20b, 20c and 20d. Note that the electric-power detection portions in the microwave heating device according to the present invention may also be configured to detect at least the amounts of reflected microwaves.

The electric-power detection portions 18a, 18b, 18c and 18d are adapted to extract amounts of electric power which are about 1/10000 the amounts of reflected microwaves or the amounts of supplied microwaves transmitted through the microwave transmission paths 17a, 17b, 17c and 17d, by setting the degree of electric-power coupling is about 40 dB, for example. The electric-power signals extracted by the respective electric-power detection portions 18a, 18b, 18c and 18d are subjected to rectification processing by detector diodes (not illustrated), then are subjected to smoothing processing by capacitors (not illustrated), and the processed signals are inputted, as detection information 23, to the control portion 21.

The control portion 21 controls the oscillating frequency and the oscillating output of the oscillation portion 11, which is a constituent of the microwave generating portion 10, and further controls the voltages applied to the variable phase portions 19a and 19b, based on heating-condition information (indicated by an arrow 22 in FIG. 2) relating to a to-be-heated object which has been set by a user through direct inputting thereto, detection information (indicated by an arrow 23 in FIG. 2) from the respective electric-power detection portions 18a, 18b, 18c and 18d, and heating-state information (indicated by an arrow 25 in FIG. 2) acquired from various types of sensors for detecting the state where the to-be-heated object is being heated during heating. As a result thereof, the microwave heating device according to Embodiment 1 is capable of heating the to-be-heated object being housed within the heating chamber 100, in an optimum state according to the heating conditions set by the user.

Further, the microwave generating portion 10 is provided with cooling fins and the like, for example, as heat-dissipation means for dissipating heat generated from the semiconductor devices. Note that within the heating chamber 100, there is provided a placement table 24 for covering the feeding portions 20a, 20b, 20c and 20d provided on the bottom wall surface 103 and for placing and housing a to-be-heated object thereon, wherein the placement table 24 is made of a low dielectric loss material.

[Heating Operations of Microwave Heating Apparatus]

Next, there will be described heating operations of the microwave heating device having the aforementioned configuration, according to Embodiment 1.

At first, a to-be-heated object is housed into the heating chamber 100, and a user inputs heating-condition information about the to-be-heated object, to an operation portion (not illustrated) provided in the microwave heating device, and then depresses a heating start key. Depressing the heating start key creates a heating start signal, and the signal is inputted to the control portion 21. The control portion 21, to which the heating start signal has been inputted, outputs a control signal to the microwave generating portion 10, which causes the microwave generating portion 10 to start operating. The control portion 21 causes a driving power supply (not illustrated), which is provided in the microwave heating device, to operate for supplying electric power to the initial-stage amplification portions 13a, 13b, 13c and 13d and the main amplification portions 15a, 15b, 15c and 15d. Thereafter, the control portion 21 supplies, to the oscillation portion 11, driving electric power and a signal for setting the oscillating frequency to 2400 MHz, which starts an oscillation in the oscillation portion 11. Note that the voltages applied to the variable phase portions 19a and 19b at this stage have been preliminarily determined. For example, according to each heating-condition information, the variable phase portions 19a and 19b can be both set in such a way as to induce no phase delay, or only one of the variable phase portions can be set in such a way as to induce a phase delay of about 180 degrees.

The output of the oscillation portion 11 being operated is divided into about 1/2 by the initial-stage electric-power dividing portion 12a, and is further divided into about 1/2 by the subsequent next-stage electric-power dividing portions 12b and 12c. As a result thereof, four microwave electric-power signals are created therefrom and are outputted, through the subsequent initial-stage amplification portions 13a, 13b, 13c and 13d and the main amplification portions 15a, 15b, 15c and 15d, from the respective output portions 16a, 16b, 16c and 16d. The outputs from the output portions 16a, 16b, 16c and 16d are transmitted to the feeding portions 20a, 20b, 20c and 20d, respectively, within the heating chamber 100 and are radiated therefrom within the heating chamber 100. At this time, in the case where both the variable phase portions 19a and 19b are set in such a way as to induce no phase delay, the microwave signals radiated from the feeding portions 20a, 20b, 20c and 20d have the same phase. Note that the voltages applied to the variable phase portions 19a and 19b determine the phase difference between the microwaves radiated within the heating chamber 100 through the feeding portions 20a and 20b from the first output portions 16a and 16b and the microwaves radiated within the heating chamber 100 through the feeding portions 20c and 20d from the second output portions 16c and 16d.

In the microwave heating device according to Embodiment 1, each of the main amplification portions 15a, 15b, 15c and 15d is configured to output microwave electric power equivalent to 1/10 the rated output, such as microwave electric power of 20 W, for example, in a stage prior to the start of actual heating of the to-be-heated object.

If the to-be-heated object absorbs 100% of the microwave electric power supplied to the inside of the heating chamber 100, no reflected electric power transmitted toward the microwave generating portion 10 from the heating chamber 100 is generated. However, since the electric characteristics of the heating chamber 100 including the to-be-heated object are determined by the type, the shape and the volume of the to-be-heated object, the to-be-heated object does not absorb all the supplied microwave electric power, which induces reflected electric power transmitted toward the microwave generating portion 10 from the heating chamber 100, based on the output impedance of the microwave generating portion 10 and the impedance of the heating chamber 100.

The electric-power detection portions 18a, 18b, 18c and 18d are adapted to output detection signals proportional to the amount of reflected microwave, by being coupled to the reflected electric power transmitted toward the microwave generating portion 10 from the heating chamber 100. The control portion 21 varies, in a stepwise manner, the oscillating frequency at predetermined frequency intervals, over the entire frequency range (from 2400 MHz to 2500 MHz, for example) which has been preliminarily defined for the oscillation portion 11 (synchronization sweeping operations). Further, the control portion 21 receives detection signals proportional to the amounts of reflected microwaves at predetermined frequency intervals from the respective electric-power detection portions 18a, 18b, 18c and 18d, and selects a preferable oscillating frequency to be used for actual heating of the to-be-heated object (frequency selection operations). In this case, such a preferable oscillating frequency is a frequency which minimizes the amounts of reflected microwaves.

In the frequency selection operations, the control portion 21 varies the oscillating frequency of the oscillation portion 11 from an initial value of 2400 MHz to an upper limit of 2500 MHz within the variable frequency range, with a 1-MHz pitch (for example, a variable speed of 1 MHz per 10 milliseconds). Based on the changes of the amounts of reflected microwaves resulted from varying the frequency during the frequency selection operations, the control portion 21 stores frequencies indicating minimal points, and detection signals corresponding to the amounts of reflected microwaves at these frequencies. Further, out of the group of the frequencies at which the changes of the amounts of reflected microwaves exhibited minimal points, the control portion 21 selects a frequency which minimized the amounts of reflected microwaves. The control portion 21 performs control for causing the oscillation portion 11 to oscillate at the selected frequency, and performs control for causing the microwave generating portion 10 to generate outputs corresponding to the set heating-condition information 22. In the microwave generating portion 10 being thus controlled, the main amplification portions 15a, 15b, 15c and 15d are each caused to output microwave electric power of about 200 W, for example, during actual heating operations on the to-be-heated object. The outputs of the main amplification portions 15a, 15b, 15c and 15d are transmitted to the feeding portions 20a, 20b, 20c and 20d through the output portions 16a, 16b, 16c and 16d, respectively, and then are supplied to the inside of the heating chamber 100.

The plural feeding portions 20a, 20b, 20c and 20d are placed symmetrically about the approximate center C0 of the bottom wall surface 103. When a to-be-heated object is housed and placed on the placement table 24 which corresponds to an area above the approximate center C0, substantially equal amounts of reflected microwaves are received by the respective feeding portions 20a, 20b, 20c and 20d and detected by the respective electric-power detection portions 18a, 18b, 18c and 18d, with respect to microwaves supplied to the inside of the heating chamber 100.

Note that at the start of actual heating, if the amounts of reflected microwaves detected by the respective electric-power detection portions 18a, 18b, 18c and 18d are largely different from one another, the control portion 21 can determine that the to-be-heated object is housed and placed such that it is largely deviated from the placement table 24 corresponding to an area above the approximate center C0 of the bottom wall surface 103. In this case, an alarm for forcing the user to house and place it again may be generated.

The microwave heating device according to Embodiment 1 is configured to perform frequency selecting operations as described above, prior to the actual heating operations on the to-be-heated object, in order to perform the actual heating operations at an appropriate oscillating frequency (heating frequency) for this to-be-heated object. Further, the microwave heating device according to Embodiment 1 is configured such that, during the actual heating operations on the to-be-heated object, the control portion 21 recognizes temporal increase/decrease changing characteristics indicating the increase/decrease changes (the temporal increase/decrease changes) in the amounts of reflected microwaves detected by the respective electric-power detection portions 18a, 18b, 18c and 18d per unit time period. The control portion 21 estimates the heating distribution state of the to-be-heated object, based on the temporal increase/decrease changes in the amount of reflected microwave from at least a single electric-power detection portion, from the temporal increase/decrease changing characteristics. Further, the control portion 21 estimates the heating state for the to-be-heated object, based on the temporal increase/decrease changes in the amounts of reflected microwave from all the electric-power detection portions 18a, 18b, 18c and 18d, and further controls processing for updating the oscillating frequency (heating frequency) in the microwave generating portion 10, and further controls the heating processing (including stopping processing).

[Control Operations in Microwave Heating Apparatus]

At first, there will be described frequency selection operations in the microwave heating device having the aforementioned configuration according to Embodiment 1 of the present invention, with reference to FIG. 4.

Figure 4:
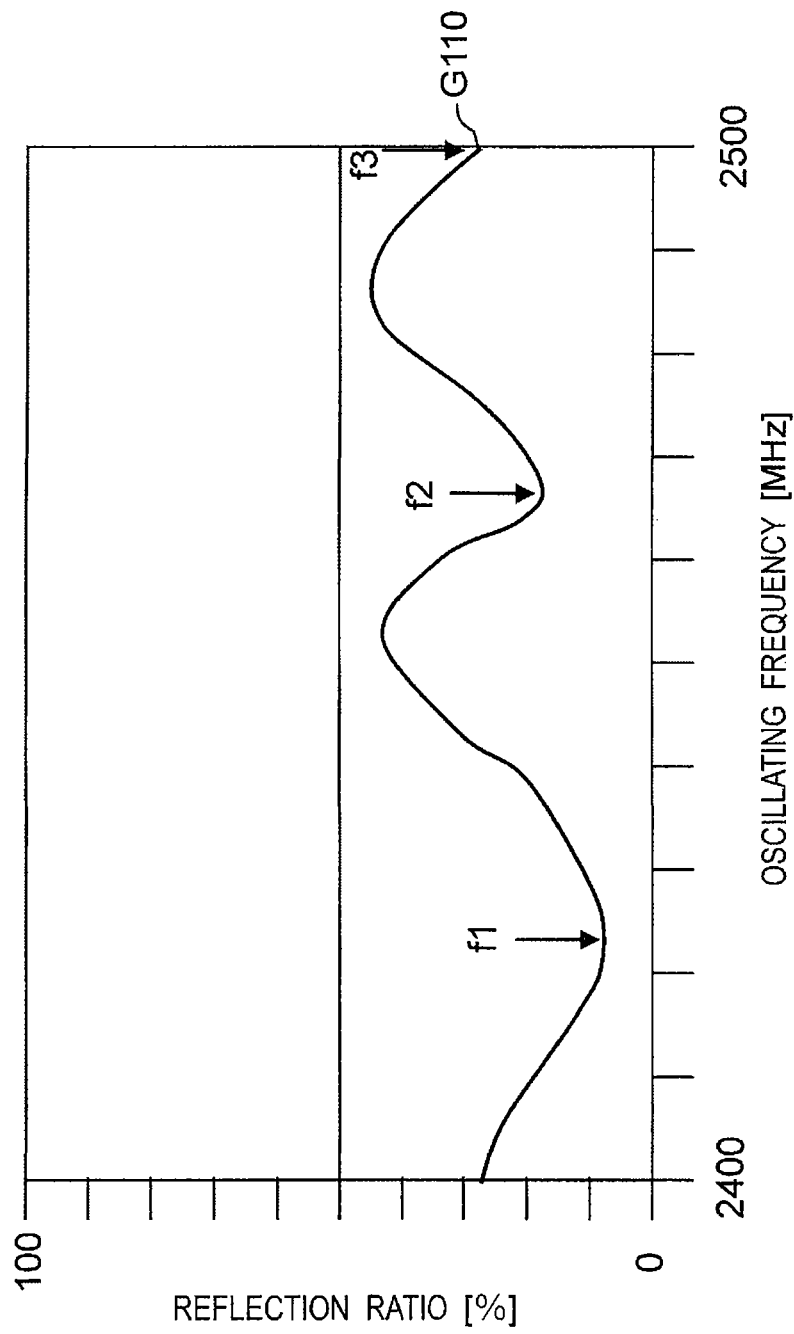
FIG. 4 is a graph illustrating an example of a characteristic curve based on respective detection signals detected by electric-power detection portions in the microwave heating device according to Embodiment 1.

FIG. 4 is a graph illustrating an example of a characteristic curve based on detection signals detected by the respective electric-power detection portions 18a, 18b, 18c and 18d in the microwave heating device according to Embodiment 1. In FIG. 4, the horizontal axis represents the oscillating frequency [MHz], while the vertical axis represents the reflection ratio (RW/SW), which is the ratio of the total sum (RW) of microwave electric power (the amounts of reflected microwaves: rw) returned to the microwave generating portion 10 through the respective feeding portions 20a, 20b, 20c and 20d from the heating chamber 100 to the total sum (SW) of microwave electric power (the amounts of supplied microwaves: sw) transmitted to the heating chamber 100 from the microwave generating portion 10 through the respective feeding portions 20a, 20b, 20c and 20d. The microwave heating device according to Embodiment 1 is configured such that the electric-power detection portions 18a, 18b, 18c and 18d detect the amounts of supplied microwaves and the amounts of reflected microwaves, and the control portion 21 calculates the reflection ratio (RW/SW) based on the respective detection signals.

Note that in the case where the electric-power detection portions are configured to detect only the amounts of reflected microwaves, the reflection ratio can be defined as being the ratio of the detected amounts of reflected microwaves to a predetermined amount of supplied microwaves which are outputted from the microwave generating portion.

FIG. 4 illustrates a reflection-ratio characteristic curve G110, in the variable frequency range (2400 MHz to 2500 MHz) of the microwave heating device according to Embodiment 1, as an example of a case where a to-be-heated object is housed in the heating chamber 100.

In the reflection-ratio characteristic curve G110 illustrated in FIG. 4, the reflection ratio (RW/SW) has minimum values, at three oscillating frequencies f1, f2 and f3. If the control portion 21 recognizes a reflection-ratio characteristic as represented by the reflection-ratio characteristic curve G110, it selects an oscillating frequency (for example, f1) which minimizes the reflection ratio, as a heating frequency for actual heating operations for the to-be-heated object.

Next, there will be described in detail an example of control operations in the microwave heating device according to Embodiment 1 of the present invention, with reference to flow charts in FIGS. 5 to 8 and exemplary characteristic curves in FIGS. 9 to 11.

Figure 5:
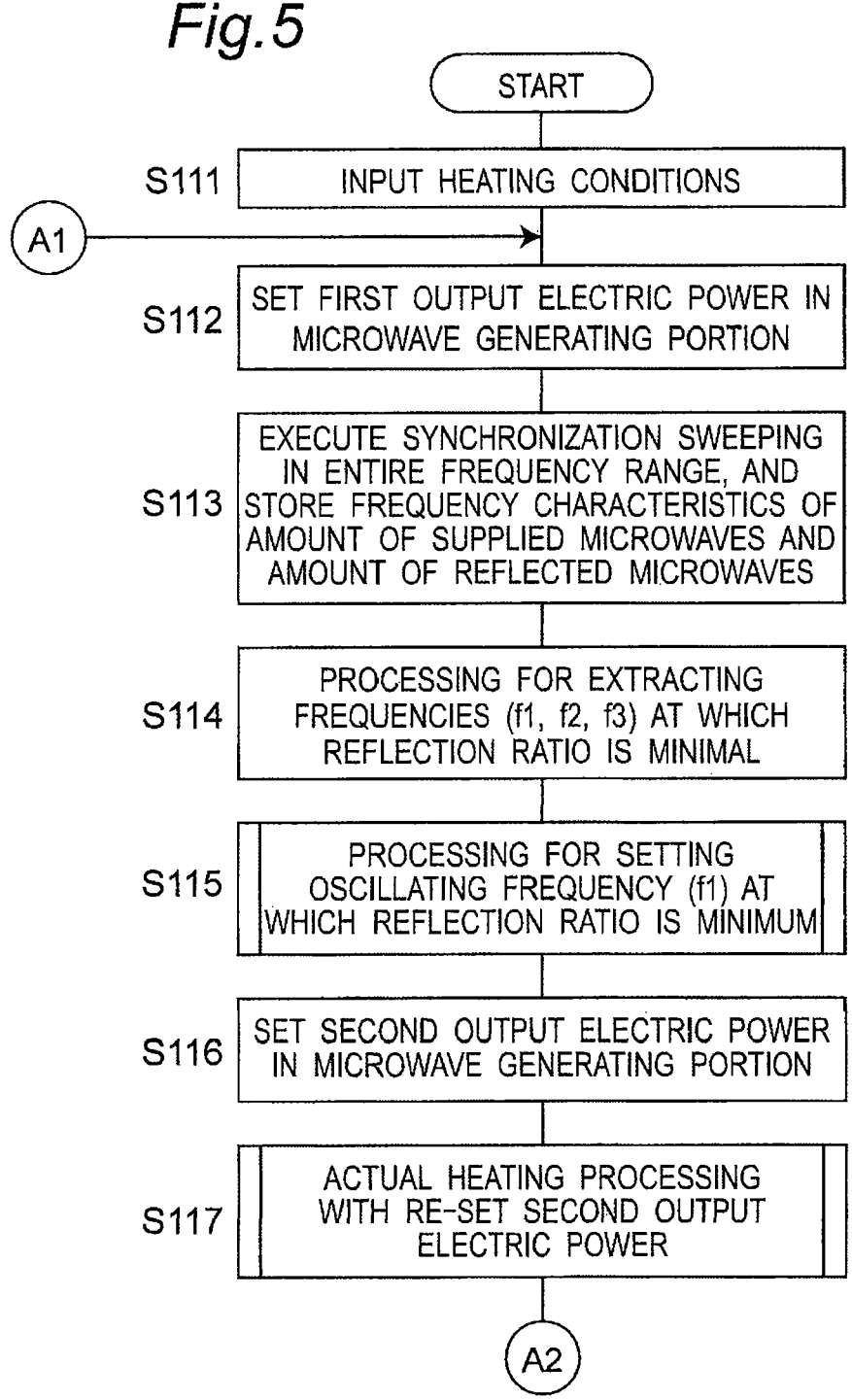
FIG. 5 is a flow chart for describing control operations in the microwave heating device according to Embodiment 1 of the present invention.

In step S111 in FIG. 5, a to-be-heated object is housed in the heating chamber 100 and is placed on the placement table 24, heating conditions are set through the operation portion, and the heating start key is depressed, which generates a heating start signal. Next, in step S112, the control portion 21, to which the heating start signal has been inputted, creates a control signal for setting the output of the microwave generating portion 10 to first output electric power, for example, electric power of less than 100 W, more specifically 20 W, for example, and causes the microwave generating portion 10 to start operating. At this time, the control portion 21 supplies predetermined driving voltages to the initial-stage amplification portions 13a, 13b, 13c and 13d and the main amplification portions 15a, 15b, 15c and 15d. Further, the control portion 21 outputs a control signal for setting the initial oscillating frequency of the oscillation portion 11 to 2400 MHz, and causes the oscillation portion 11 to start an oscillating operation. As described above, in the initial stage, the microwave generating portion 10 outputs, as first output electric power, microwave electric power of less than 100 W at 2400 MHz.

Next, in step S113, the oscillating frequency of the oscillation portion 11 is varied from the initial oscillating frequency of 2400 MHz to higher frequencies with a 1-MHz pitch (at a sweeping speed of 1 MHz per 10 milliseconds, for example), and is varied to 2500 MHz, which is the upper limit of the variable frequency range (synchronization sweeping operations over the entire frequency range). During the synchronization sweeping operations as the variable frequency operations, the amounts of supplied microwaves and the amounts of reflected microwaves which have been acquired, with a 1-MHz pitch, from the respective electric-power detection portions 18a, 18b, 18c and 18d are stored, and the operation proceeds to step S114.

In step S114, the control portion 21 performs processing for extracting a group of frequencies at which a reflection-ratio characteristic curve representing the reflection ratio (RW/SW) has minimum values, for example, a group of oscillating frequencies f1, f2 and f3 in FIG. 4, wherein the reflection ratio (RW/SW) is the ratio of the total sum (RW) of the amounts of reflected microwaves to the total sum (SW) of the amounts of supplied microwaves acquired from the respective electric-power detection portions 18a, 18b, 18c and 18d.

Then, the operation proceeds to step S115. In step S115, an oscillating frequency which minimizes the reflection ratio (RW/SW), for example, frequency f1 in FIG. 4, is selected. Then, the operation proceeds to step S116.

In step S116, the control portion 21 controls the output of the oscillation portion 11, such that the microwave generating portion 10 generates second output electric power which is the rated output or an output set as a heating condition, such as 200 W, for example. Note that the control portion 21 may be configured to control the driving voltages for both the initial-stage amplification portions 13a, 13b, 13c and 13d and the main amplification portions 15a, 15b, 15c and 15d or control only the driving voltages for the main amplification portions 15a, 15b, 15c and 15d, in setting the second output electric power, in accordance with the specifications of the microwave heating device.

Next, in step S117, an actual heating operation is started with the second output electric power set in step S116. In the actual heating operation, the operation proceeds to step S118 (see FIG. 6) to start a summation of the heating time period during the actual heating operation. Then, the operation proceeds to step S119. In step S119, the control portion 21 takes in detection signals corresponding to the amounts of supplied microwaves (sw) and the amounts of reflected microwaves (rw) which have been detected by the respective electric-power detection portions 18a, 18b, 18c and 18d, and then the operation proceeds to step S120.

In step S120, it is determined whether or not any one of the amounts of reflected microwaves (rw) detected by the respective electric-power detection portions 18a, 18b, 18c and 18d has exceeded a predetermined value. Namely, in step S120, it is checked whether any of the detected amounts of reflected microwaves (rw) are equal to or less than the predetermined value. In this case, the "predetermined value" is a value (for example, 50 W) corresponding to a ratio of 25% as the ratio of the amount of reflected microwaves (rw) to the amount of supplied microwaves (sw) detected by each of the electric-power detection portions 18a, 18b, 18c and 18d.

If the amounts of reflected microwaves (rw) detected by the respective electric-power detection portions 18a, 18b, 18c and 18d are equal to or less than the predetermined value, the operation proceeds to step S121. If they have exceeded the predetermined value, the operation proceeds to step S201 (see FIG. 6).

[Control Content in Step S120]

Next, control content in step S120 will be described in more detail with reference to FIG. 9. FIG. 9 illustrates characteristic curves resulted from actual heating processing on a certain to-be-heated object A as a to-be-heated object, with the microwave heating device according to Embodiment 1. Referring to FIG. 9, the horizontal axis represents the heating time period [sec] while the vertical axis represents the amounts of reflected microwaves (rw) detected by the respective electric-power detection portions 18a, 18b, 18c and 18d. Further, in FIG. 9, the characteristic curves detected by the respective electric-power detection portions 18a, 18b, 18c and 18d are designated by the reference numerals of the respective feeding portions 20a, 20b, 20c and 20d. Note that regarding the characteristic curves in FIG. 10 and the later figures, similarly, the characteristic curves detected by the respective electric-power detection portions 18a, 18b, 18c and 18d are designated by the reference numerals of the respective feeding portions 20a, 20b, 20c and 20d.

Figure 8:
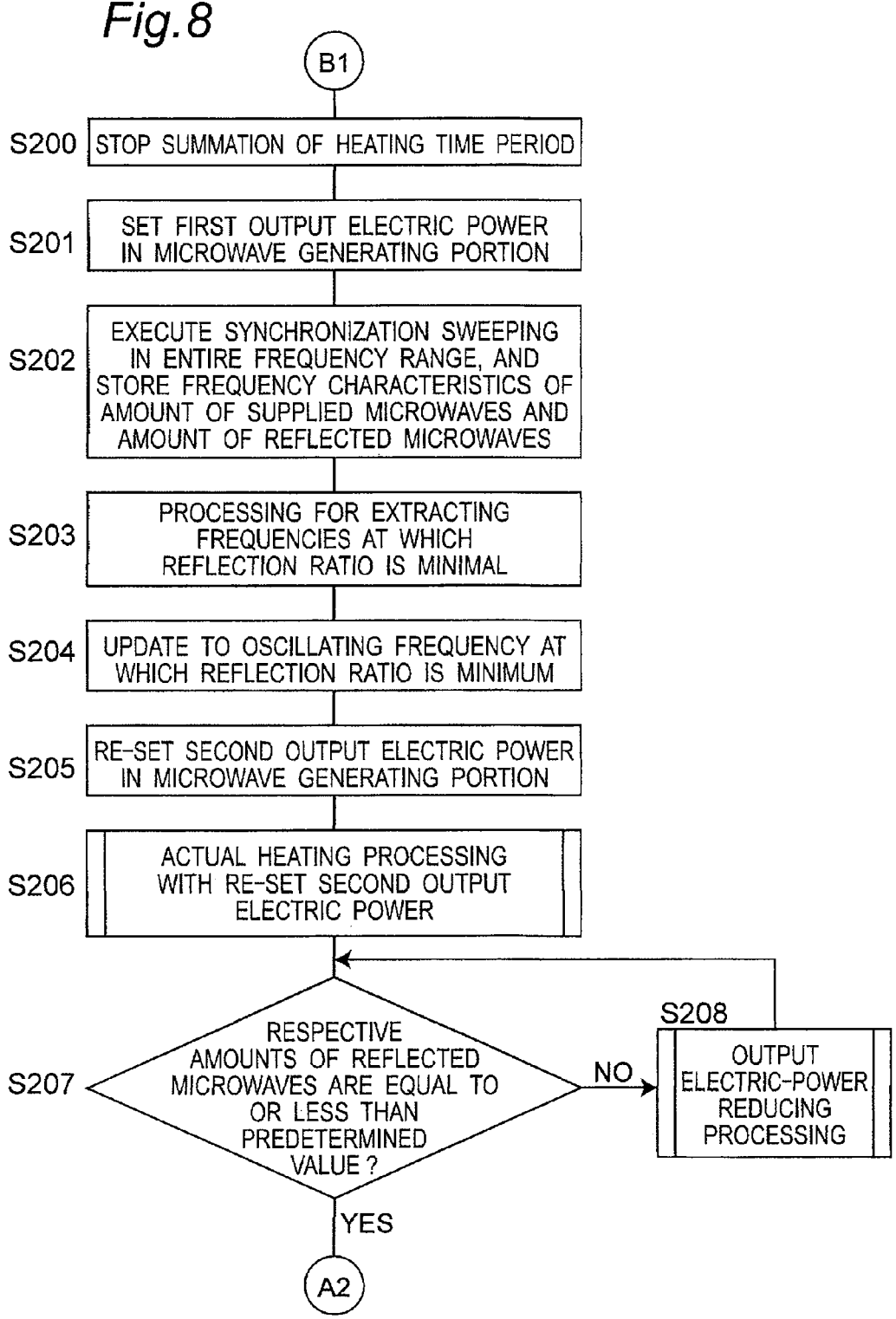
FIG. 8 is a flow chart for describing control operations in the microwave heating device according to Embodiment 1 of the present invention.
Figure 9:
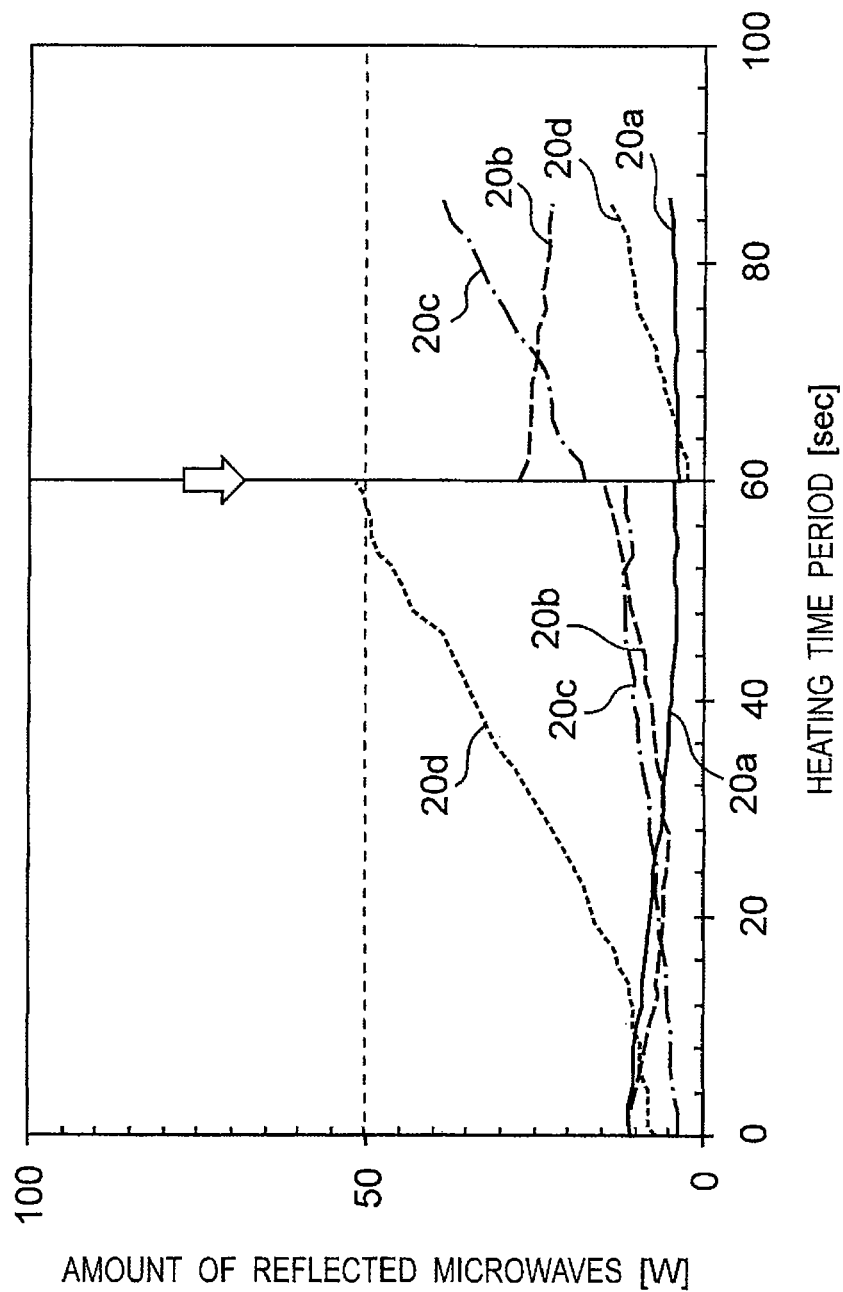
FIG. 9 is a characteristic curve plot for describing control operations in the microwave heating device according to Embodiment 1 of the present invention.

Referring to the characteristic curves illustrated in FIG. 9, the amount of reflected microwaves (rw) received by the feeding portion 20d is anomalously increased in comparison with those of the other feeding portions 20a, 20b and 20c, and when the heating time period is about 60 seconds, it has reached 50 watt (electric power corresponding to a ratio of 25% as the ratio of the amount of reflected microwaves (rw) to the amount of supplied microwaves (sw)), which is the pre-set predetermined value of the amount of reflected microwaves. If the control portion 21 determines that any of the amounts of reflected microwaves have exceeded the predetermined value, it proceeds to step S200 and later steps (see FIG. 8). Control contents in step S200 and later steps will be described later.

Figure 6:
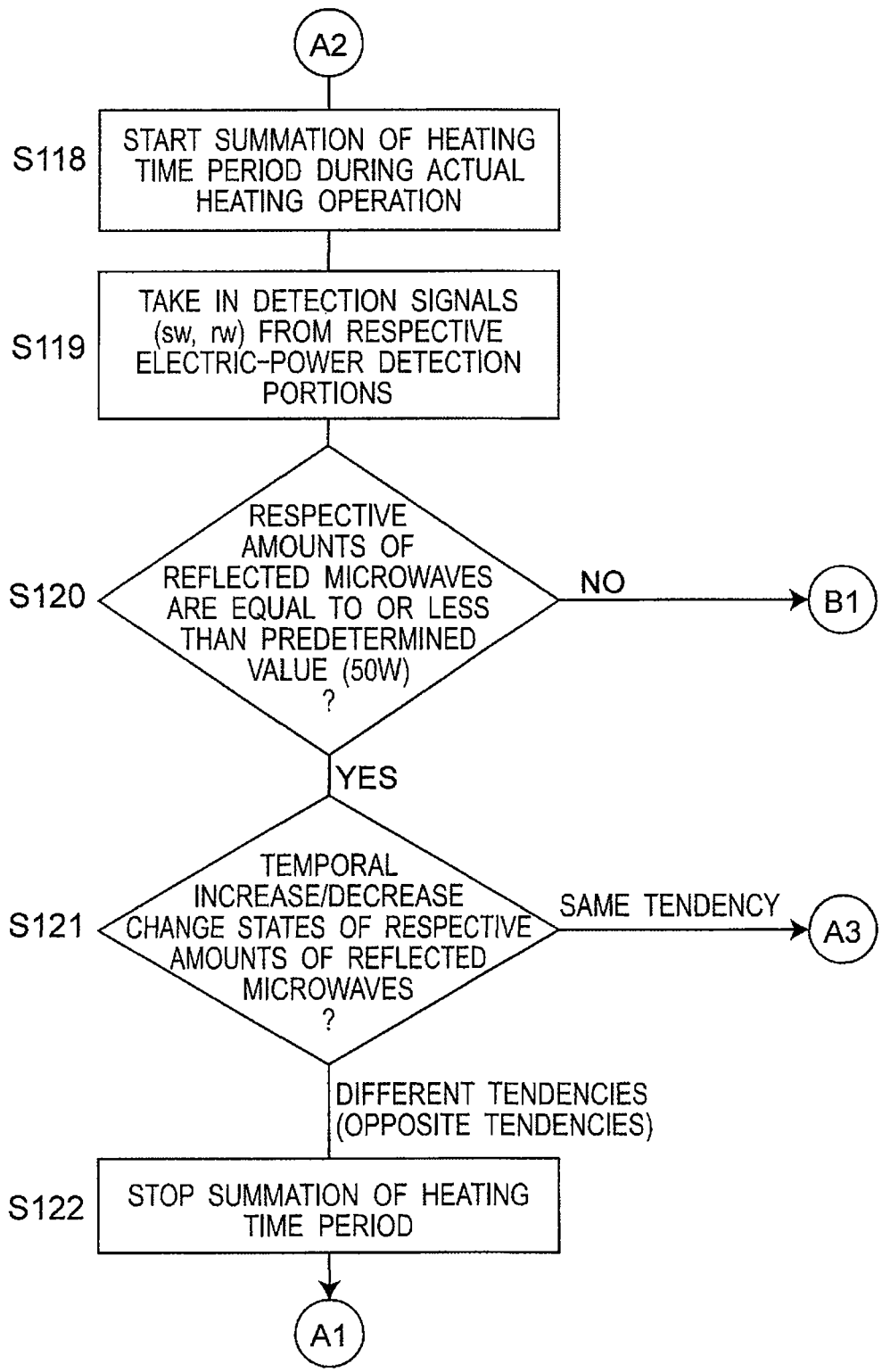
FIG. 6 is a flow chart for describing control operations in the microwave heating device according to Embodiment 1 of the present invention.

In step S120 in FIG. 6, if the amounts of reflected microwaves (rw) are equal to or less than the predetermined value, as a result of the aforementioned control content, the operation proceeds to step S121. In step S121, a comparison is made among the amounts of reflected microwaves detected by the respective electric-power detection portions 18a, 18b, 18c and 18d, in terms of their temporal increase/decrease changes, in order to determine the state of progress of the heating of the to-be-heated object. The determination in step S121 is performed, based on the changes of the amounts of per-unit-time increases/decreases (the amounts of changes of temporal increases/decreases) in the amounts of reflected microwaves detected by the respective electric-power detection portions 18a, 18b, 18c and 18d. In step S121, it is determined whether the four amounts of reflective microwaves have the same tendency or different tendencies (opposite tendencies), in terms of the states of changes of the amounts of per-unit-time increases/decreases therein. In other words, in step S121, it is determined whether the amounts of temporal increases/decrease changes in the four amounts of reflected microwaves are such that they have increased in the same way or have decreased in the same way, or any one of them has changed in a different way from the others, for example, any one of them has increased unlike the others or has decreased unlike the others.

Figure 7:
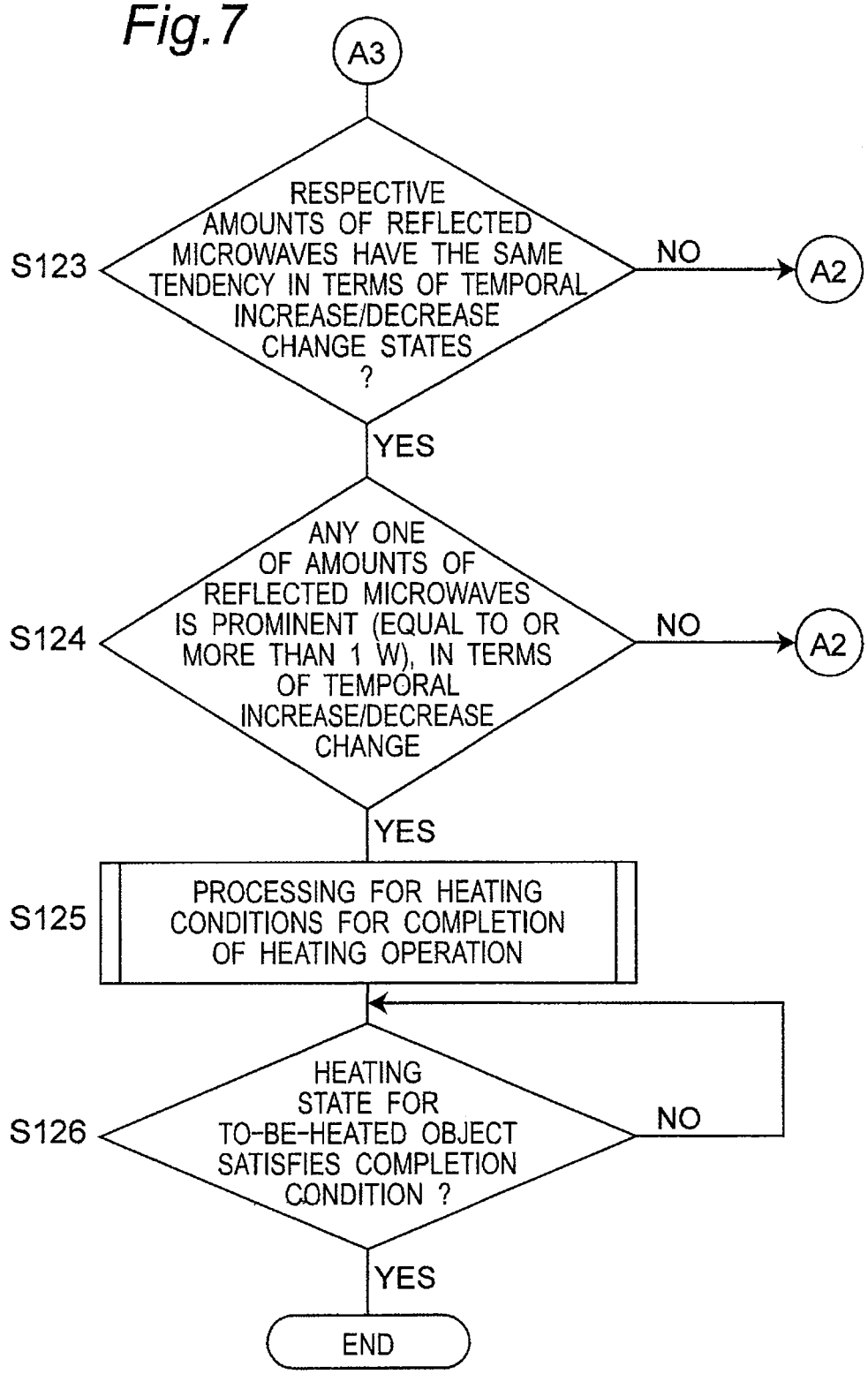
FIG. 7 is a flow chart for describing control operations in the microwave heating device according to Embodiment 1 of the present invention.

If, in step S121, the respective amounts of reflected microwaves have the same tendency (in a state where they do not have opposite tendencies), in terms of the states of the changes of temporal increases/decreases therein, the operation proceeds to step S123 (see FIG. 7). On the other hand, if they have different tendencies (in a state where they have opposite tendencies), the operation proceeds to step S122.

If any one of the respective amounts of reflected microwaves has a different tendency from the others (in a state where it has an opposite tendency), in terms of the state of the change of temporal increase/decrease therein, in step S122, the summation of the heating time period during the actual heating operation is stopped, and the operation returns to step S112 (see FIG. 5). In this case, in series of steps from step S112 to step S115, the aforementioned synchronization sweeping operations are performed, a new oscillating frequency to be used in actual heating operations is selected, and processing for updating it is performed. After the updating processing has been performed, the setting of second output electric power is performed in step S116, and an actual heating operation is started in step S117 (actual heating processing). In step S118 illustrated in FIG. 6, the summation of the heating time period in the actual heating operation is started, and the operation proceeds to step S119.

[Control Content in Step S121]

Figure 10:
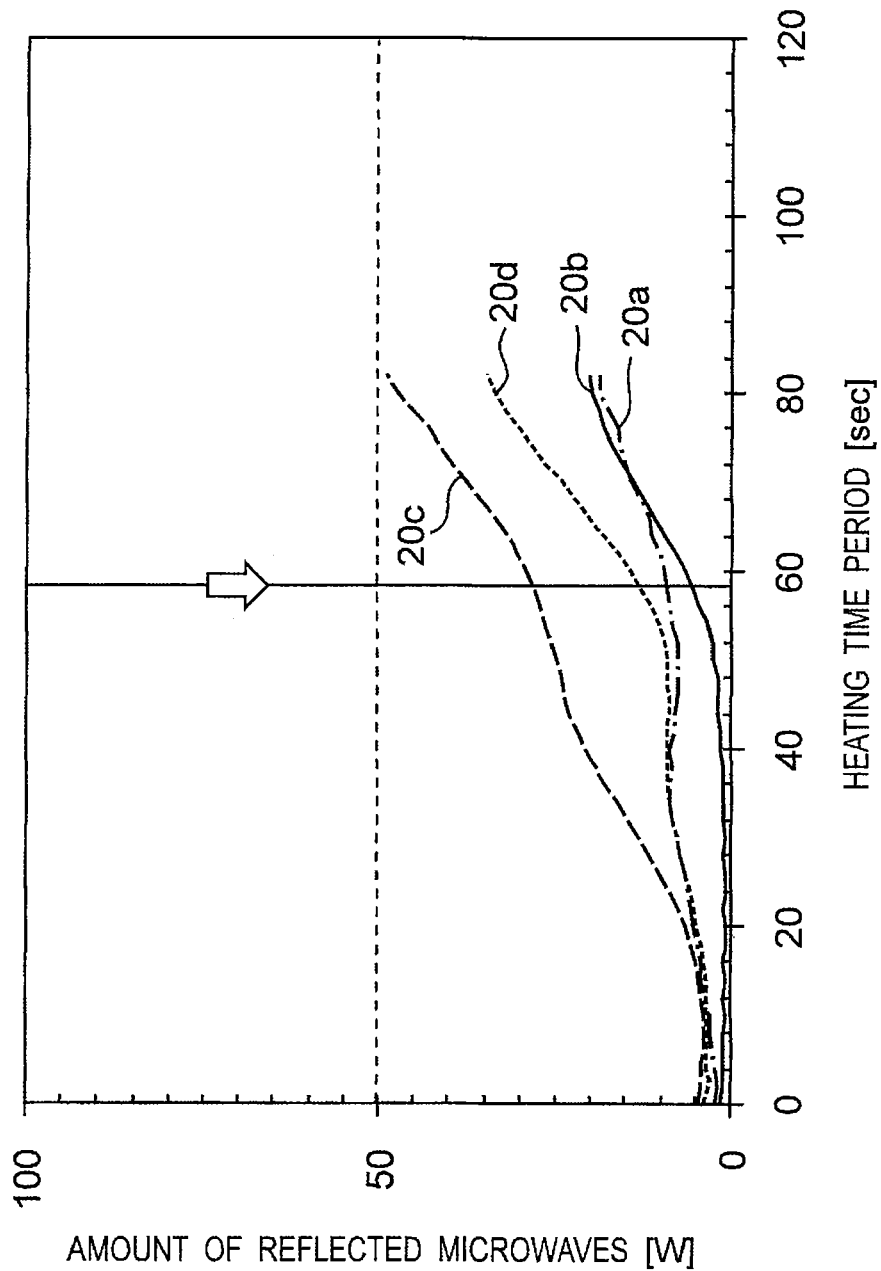
FIG. 10 is a characteristic curve plot for describing control operations in the microwave heating device according to Embodiment 1 of the present invention.
Figure 11:
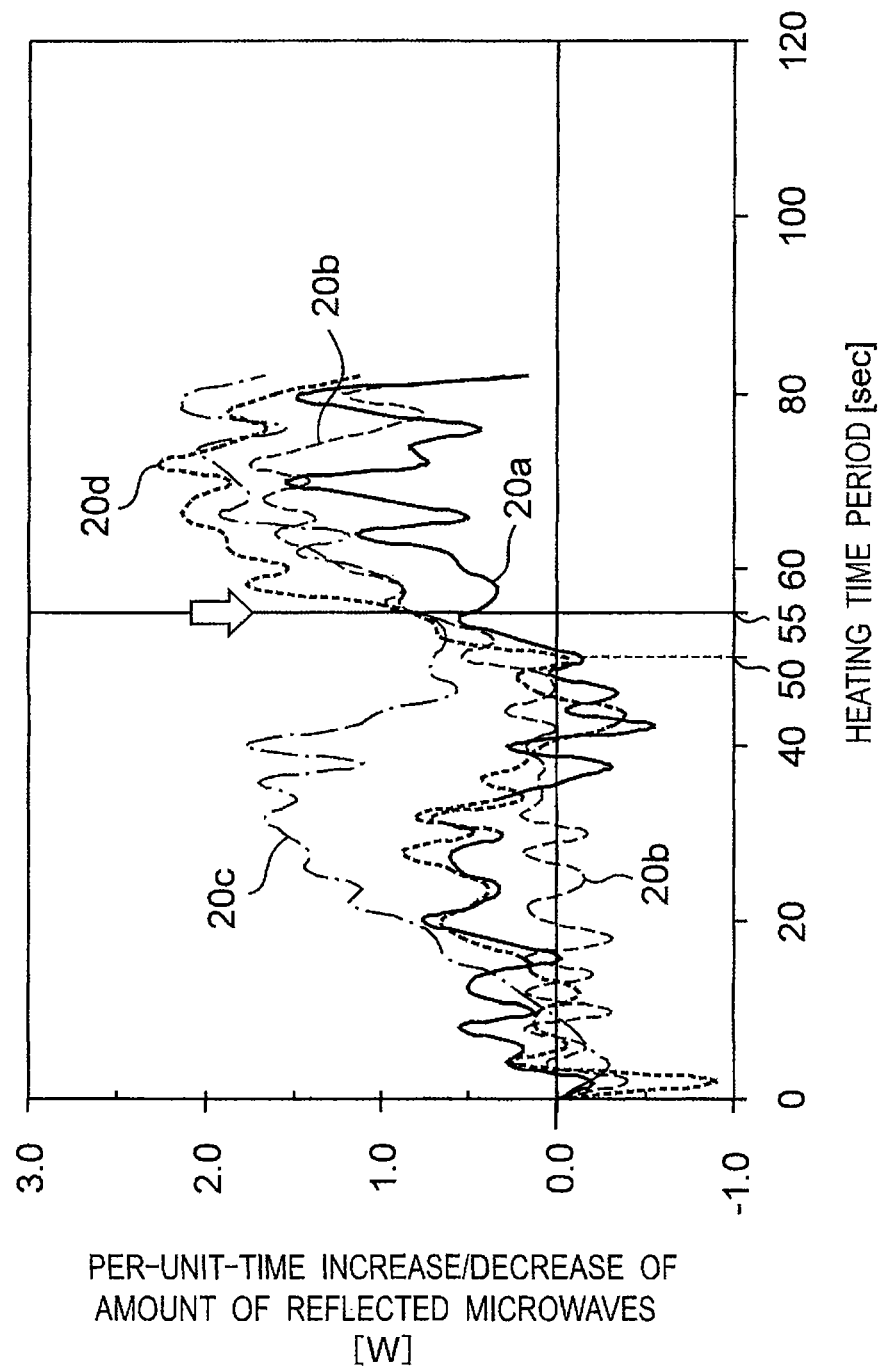
FIG. 11 is a characteristic curve plot for describing control operations in the microwave heating device according to Embodiment 1 of the present invention.

Next, there will be described, in detail, specific operations for the comparison and the determination which are performed in step S121, with reference to FIG. 10 and FIG. 11 illustrating specific exemplary characteristic curves.

FIG. 10 is time-varying characteristic curves of the amounts of reflected microwaves (rw) resulted from actual heating processing on a certain to-be-heated object B as a to-be-heated object, with the microwave heating device according to Embodiment 1. Referring to FIG. 10, the horizontal axis represents the heating time period [sec] while the vertical axis represents the amounts of reflected microwaves [W] detected by the respective electric-power detection portions 18a, 18b, 18c and 18d. Further, in FIG. 10 the time-varying characteristic curves detected by the respective electric-power detection portions 18a, 18b, 18c and 18d are designated by the reference numerals of the respective feeding portions 20a, 20b, 20c and 20d.

FIG. 11, which corresponds to the time-varying characteristic curves in FIG. 10, illustrates increase/decrease change characteristic curves representing per-unit-time increase/decrease change states of the amounts of reflected microwaves (rw). Referring to FIG. 9, the horizontal axis represents the heating time period [sec] while the vertical axis represents the per-unit-time increase/decrease in the amount of reflected microwaves [W] detected by each of the electric-power detection portions 18a, 18b, 18c and 18d.

Referring to the time-varying characteristic curves illustrated in FIG. 10, there is not induced a state where the amounts of reflected microwaves exceeds the predetermined value halfway through the heating, as illustrated in FIG. 9. Further, referring to the time-varying characteristic curves illustrated in FIG. 10, almost all the characteristic curves have a tendency to increase. Referring to the increase/decrease change characteristic curves in FIG. 11 representing the per-unit-time increase/decrease change states of the respective amounts of reflected microwaves, the detection signals detected by the electric-power detection portion 18b connected to the feeding portion 20b (particularly, in the state where the heating time period is less than 50 seconds) exhibit a property of repeatedly increasing (in the positive region) and decreasing (in the negative region). As described above, in the case where the detection signals have such a property of repeatedly increasing and decreasing at short-time intervals and thus having no tendency to increase or decrease continuously with time, the control portion 21 does not determine that these detection signals (20b) have a property of changing with a different tendency (opposite tendency), but temporarily determines that they have a similar tendency rather than the opposite tendency and thus the control portion 21 continues the heating operation. Accordingly, in cases of increase/decrease change characteristics as illustrated in FIG. 11, the control portion 21 proceeds from step S121 to step S123 (see FIG. 7). In step S123, it is determined again whether the amounts of reflected microwaves can be certainly determined to have the same tendency, in terms of their temporal increase/decrease change states. If it is determined in step S123 that the amounts of reflected microwaves have the same tendency in terms of their temporal increase/decrease change states, the operation proceeds to step S124. On the other hand, if the amounts of reflected microwaves can not be certainly determined to have the same tendency in terms of their temporal increase/decrease change states in step S123, the operation returns to step S118 (see FIG. 6).

Accordingly, in the examples of the characteristic curves illustrated in FIG. 10 and FIG. 11, the respective steps, which are step S118, step S119 and step S120 in the mentioned order, are executed, in order to carry forward the processing for heating the to-be-heated object B.

Referring to the characteristic curves illustrated in FIG. 11, in the state after the heating time period has reached about 50 seconds, all the amounts of reflected microwaves detected by the four electric-power detection portions 18a, 18b, 18c and 18d have a tendency to increase (in the positive region), in terms of temporal increase/decrease changes therein. Accordingly, in this state, it is determined, in step S123, that the amounts of reflected microwaves have the same tendency in terms of their temporal increase/decrease change states, and the operation proceeds to step S124. In step S124, it is determined whether or not the per-unit-time increase/decrease changes in the amounts of reflected microwaves have been prominent, for example, it is determined whether or not the temporal increase/decrease change in at least one of the amounts of reflected microwaves has been equal to or more than a threshold value as a predetermined determination index. In this case, the threshold value as the determination index is ±1 W. If it is determined, in step S124, that the temporal increase/decrease change in at least one of the amounts of reflected microwaves has exceeded the determination index and, thus, has been prominent, the operation proceeds to step S125. On the other hand, if it is determined, in step S124, that the temporal increase/decrease changes in the amounts of reflected microwaves have not been prominent, for example, they have been less than ±1 W, the operation returns to step S118 (see FIG. 6), again.

Referring to the characteristic curves illustrated in FIG. 11, in the state after the heating time period has reached about 55 seconds, all the amounts of reflected microwaves detected by the four electric-power detection portions 18a, 18b, 18c and 18d have a tendency to increase (in the positive region), in terms of their temporal increase/decrease changes and, also, the temporal increase/decrease change in at least one of the amounts of reflected microwaves is equal to or more than 1 W. In this heating state, in step S121, it is determined that the amounts of reflected microwaves have the same tendency (including states where they repeatedly increase or decrease at short time intervals), rather than having opposite tendencies, in terms of temporal increase/decrease changes therein, and the operation proceeds to step S123 (see FIG. 6). Further, in step S123, it is determined that all the amounts of reflected microwaves have the same tendency in terms of temporal increase/decrease changes therein, and the operation proceeds to step S124. Further, in step S124, it is determined that the amount of per-unit-time increase/decrease change in at least one of the amounts of reflected microwaves has been prominent (for example, equal to or more than ±1 W), and the operation proceeds to step S125.

In step S125, processing for various types of heating conditions required for completing the heating operation for the to-be-heated object B is performed. For example, the control portion 21 determines whether or not the heating processing time period set by the user has been satisfied, whether the temperature on the surface of the to-be-heated object B has reached from about 60 degrees to 70 degrees, and the like. Further, based on the value of the summed heating time period until the current time point, and based on the integrated value of the actually-supplied microwave electric power, the completion time period required for reaching the finishing temperature for the to-be-heated object B is calculated, and the heating processing is continued. Further, during the time period until the finishing temperature has been reached, if any one of the amounts of reflected microwaves detected by the electric-power detection portions 18a, 18b, 18c and 18d exceeds the aforementioned predetermined value (for example, 50 W), the heating should be completed at this time point. This condition is also appended thereto.

After the execution of the heating-condition processing in step S125, the operation proceeds to step S126 where, if any one of the aforementioned conditions required for the completion of the heating operation is satisfied, the actual heating operation is completed.

[Control Contents in and after Step S200]

Next, there will be described control contents in and after step S200 in the case where the amounts of reflected microwaves (rw) have exceeded the predetermined value in step S120.

Referring to the flow chart illustrated in FIG. 8, in step S200, the summation of the heating time period during the actual heating operation is stopped, and the operation proceeds to step S201. In step S201, the control portion 21 outputs control signals for setting the oscillating frequency of the oscillation portion 11 to an initial oscillating frequency of 2400 MHz, and for setting the microwave electric power from the microwave generating portion 10 to a first output electric power. Next, in step S202, the oscillating frequency of the oscillation portion 11 is varied from the initial oscillating frequency of 2400 MHz to higher frequencies with a 1-MHz pitch (at a sweeping speed of 1 MHz per 10 milliseconds, for example) and, thus, is varied to 2500 MHz, which is the upper limit of the variable frequency range (synchronization sweeping operations over the entire frequency range). During the synchronization sweeping operations as the variable frequency operations, the amounts of supplied microwaves (sw) and the amounts of reflected microwaves (rw) which have been acquired, with a 1-MHz pitch, from the respective electric-power detection portions 18a, 18b, 18c and 18d are stored, and the operation proceeds to step S203.

In step S203, the control portion 21 performs processing for extracting a group of frequencies at which a reflection-ratio characteristic curve representing the reflection ratio (RW/SW) has minimum values, for example, a group of oscillating frequencies f1, f2 and f3 in cases of a characteristic curve as illustrated in FIG. 4 described above, wherein the reflection ratio (RW/SW) is the ratio of the total sum (RW) of the amounts of reflected microwaves to the total sum (SW) of the amounts of supplied microwaves acquired from the respective electric-power detection portions 18a, 18b, 18c and 18d. Then, the operation proceeds to step S204. In step S204, an oscillating frequency which minimizes the reflection ratio (RW/SW), for example, the frequency f1 in the characteristic curve illustrated in FIG. 4 described above, is selected, and the heating frequency for actual heating is updated. Then, the operation proceeds to step S205.

In step S205, the control portion 21 controls the output of the oscillation portion 11, such that the microwave generating portion 10 generates a second output electric power which is the rated output or an output set as a heating condition, such as 200 W, for example. Then, the operation proceeds to step S206.

In step S206, an actual heating operation is started with the second output electric power, with the heating frequency updated in step S204. Then, the operation proceeds to step S207.

In step S207, it is determined whether or not the amounts of reflected microwaves (rw) detected by the respective electric-power detection portions 18a, 18b, 18c and 18d are equal to or less than a predetermined value. Here the "predetermined value" is a value corresponding to a ratio of 25% as the ratio of the amount of reflected microwaves (rw) to the amount of supplied microwaves (sw) transmitted to each of the feeding portions 20a, 20b, 20c and 20d and, for example, in the case where the amount of supplied microwave is 200 W, the predetermined value is 50 W. Accordingly, in step S207, it is determined whether or not the amounts of reflected microwaves (rw) are equal to or less than 50 W. If the detected amounts of reflected microwaves have not exceeded the predetermined value, the operation returns to step S118 (see FIG.

6). On the other hand, if the amounts of reflected microwaves have exceeded the predetermined value, the operation proceeds to step S208.

In step S208, an operation for processing for reducing the output electric power of the oscillation portion 11 is performed. This output electric-power reducing processing is for gradually reducing the output of the oscillation portion 11, in the case where the second output electric power is 100%, for example, by setting electric power equivalent to 90% thereof as third output electric power, further setting electric power equivalent to 75% thereof as fourth output electric power, and setting electric power equivalent to 50% thereof as fifth output electric power. The output of the oscillation portion 11 is gradually reduced, until the all the amounts of reflected microwaves detected by the respective electric-power detection portions 18a, 18b, 18c and 18d have become equal to or less than a preset predetermined value (for example, 50 W). At the time point when they have become equal to or less than the predetermined value, the operation returns to step S118. Note that when the output of the oscillation portion 11 is the fifth output electric power, which is equivalent to 50% of the second output electric power, if any of the amounts of reflected microwaves has exceeded the predetermined value, the heating operation may be stopped to complete the heating processing.

By performing the control processing in and after step S200 as described above, an actual heating operation is started with the updated heating frequency resulted from the detection through new synchronization sweeping operations. In cases where the control processing in and after step S200 is executed as described above, as illustrated in the characteristic curves in FIG. 9, for example, the amounts of reflected microwaves have properties as those after the heating time period has reached 60 seconds. Namely, referring to the characteristic curves in FIG. 9, at the updated heating frequency, the amount of reflected microwaves (20d) corresponding to the feeding portion 20d is largely decreased.

Note that after updating the heating frequency, all the amounts of reflected microwaves may not have a property of decreasing, and the amounts of reflected microwaves may have a property of increasing at some feeding portions. In the case of the characteristic curves illustrated in FIG. 9, the amount of reflected microwaves (20b) corresponding to the feeding portion 20b is increased, after the updating. However, this amount of reflected microwaves (20b) is equal to or less than the predetermined value (50 W), and consequently an actual heating operation is started again with the updated heating frequency.

Note that the control portion 21 may be configured to control the driving voltages for both the initial-stage amplification portions 13a, 13b, 13c and 13d and the main amplification portions 15a, 15b, 15c and 15d or to control only the driving voltages for the main amplification portions 15a, 15b, 15c and 15d, in order to gradually decrease the output, in setting the output electric power after the updating.

Further, the aforementioned control method by the control portion 21 may be employed for gradually reducing the output from the second output electric power to the third and later output electric power, in step S208 (see FIG. 8). Namely, the output electric power from the microwave generating portion 10 can be reduced by performing control for reducing the driving voltages for the initial-stage amplification portions 13a, 13b, 13c and 13d and/or the main amplification portions 15a, 15b, 15c and 15d, and these operations for adjustments for reducing the driving voltages are executed, until all the amounts of reflected microwaves detected by the respective electric-power detection portions 18a, 18b, 18c and 18d become equal to or less than the predetermined value in step S207 or become preset minimum output electric power. Further, it is also possible to perform control for returning to step S118, when all the amounts of reflected microwaves have become equal to or less than the predetermined value. Note that if all the amounts of reflected microwaves can not become equal to or less than the predetermined value even with the preset minimum output electric power, the heating operation can be stopped to complete the heating processing.

(Embodiment 2)

Hereinafter, there will be described a microwave heating device according to Embodiment 2 of the present invention, with reference to the attached FIGS. 12 to 19. The microwave heating device according to Embodiment 2 is adapted to perform the determinations in step S120 and step S121 in the flow chart in FIG. 6 and the determinations in step S123 and step S124 in the flow chart of FIG. 7, which have been described in above-described Embodiment 1, based on the value of VSWR (voltage standing wave ratio) calculated based on both the values of the amounts of supplied microwaves and the amounts of reflected microwaves, instead of the amounts of reflected microwaves. The microwave heating device according to Embodiment 2 is different from the microwave heating device according to above-described Embodiment 1, in the aforementioned control contents, but they have the same configuration.

Accordingly, in Embodiment 2, there will be described only the control contents different from those of Embodiment 1, and descriptions about other operations and configurations thereof will be given by the descriptions about Embodiment 1. Further, in the descriptions of Embodiment 2, the components having the same functions and configurations as those of above-described Embodiment 1 will be designated by the same reference characters, and descriptions thereof will be given by the descriptions of Embodiment 1.

Hereinafter, there will be described VSWR (voltage standing wave ratio) control operations in the microwave heating device according to Embodiment 2.

In the microwave heating device according to above-described Embodiment 1, in step S120 and step S121 in the flow chart illustrated in FIG. 6 and in step S123 and step S124 in the flow chart in FIG. 7, the determination processing is performed by detecting the amounts of reflected microwaves (rw), and the per-unit-time increase/decrease change states of these amounts of reflected microwaves (rw). In the microwave heating device according to Embodiment 2, the aforementioned determination processing is performed, by calculating VSWRs (voltage standing wave ratios) based on both the values of the amounts of supplied microwaves (sw) and the amounts of reflected microwaves (rw). Further, the determination processing in the respective steps S120, S121, S123 and S124 is performed based on time-varying characteristics and per-unit-time increase/decrease change characteristics of the VSWRs. The other steps in the microwave heating device according to Embodiment 2 are the same as those of the microwave heating device according to Embodiment 1.

Figure 12:
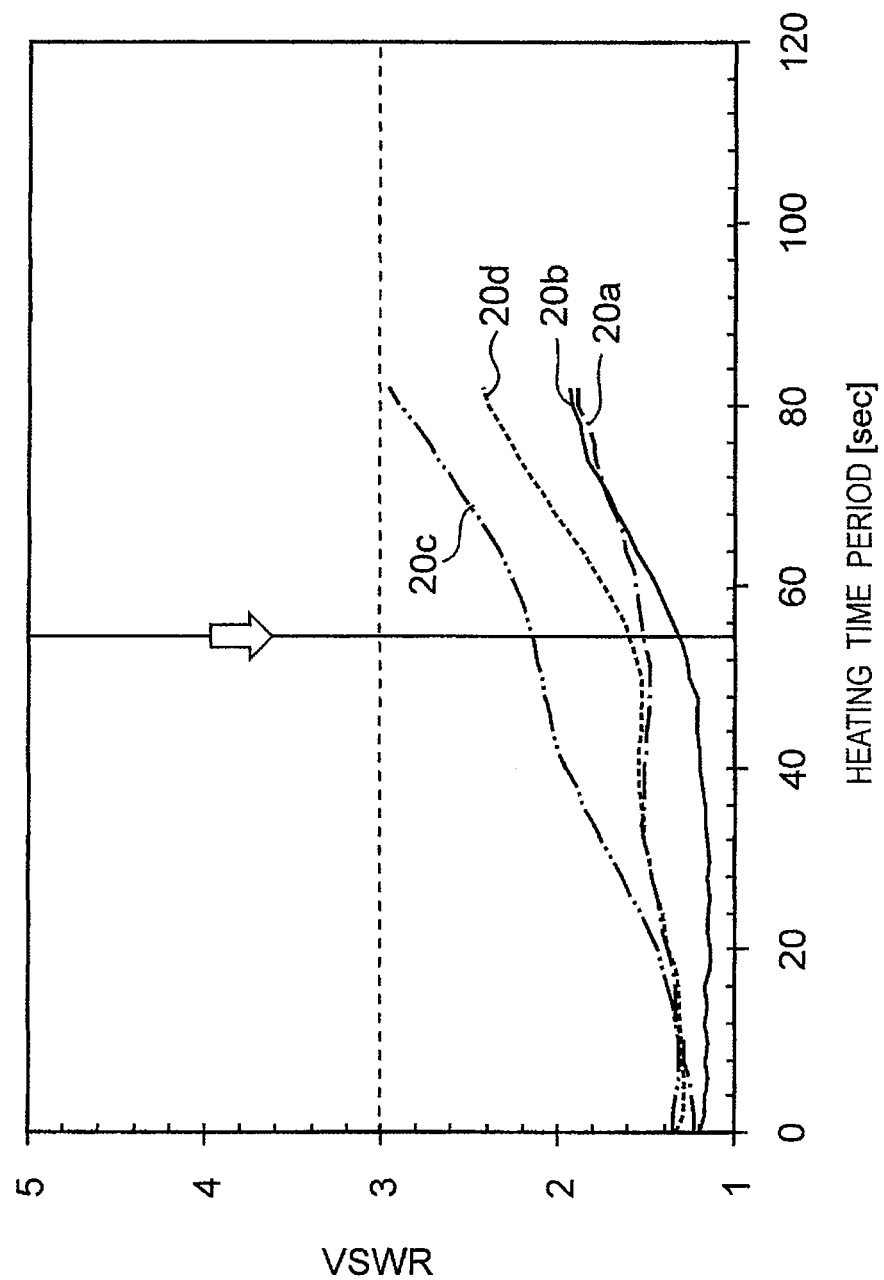
FIG. 12 is a characteristic curve plot for describing control operations in a microwave heating device according to Embodiment 2 of the present invention.
Figure 13:
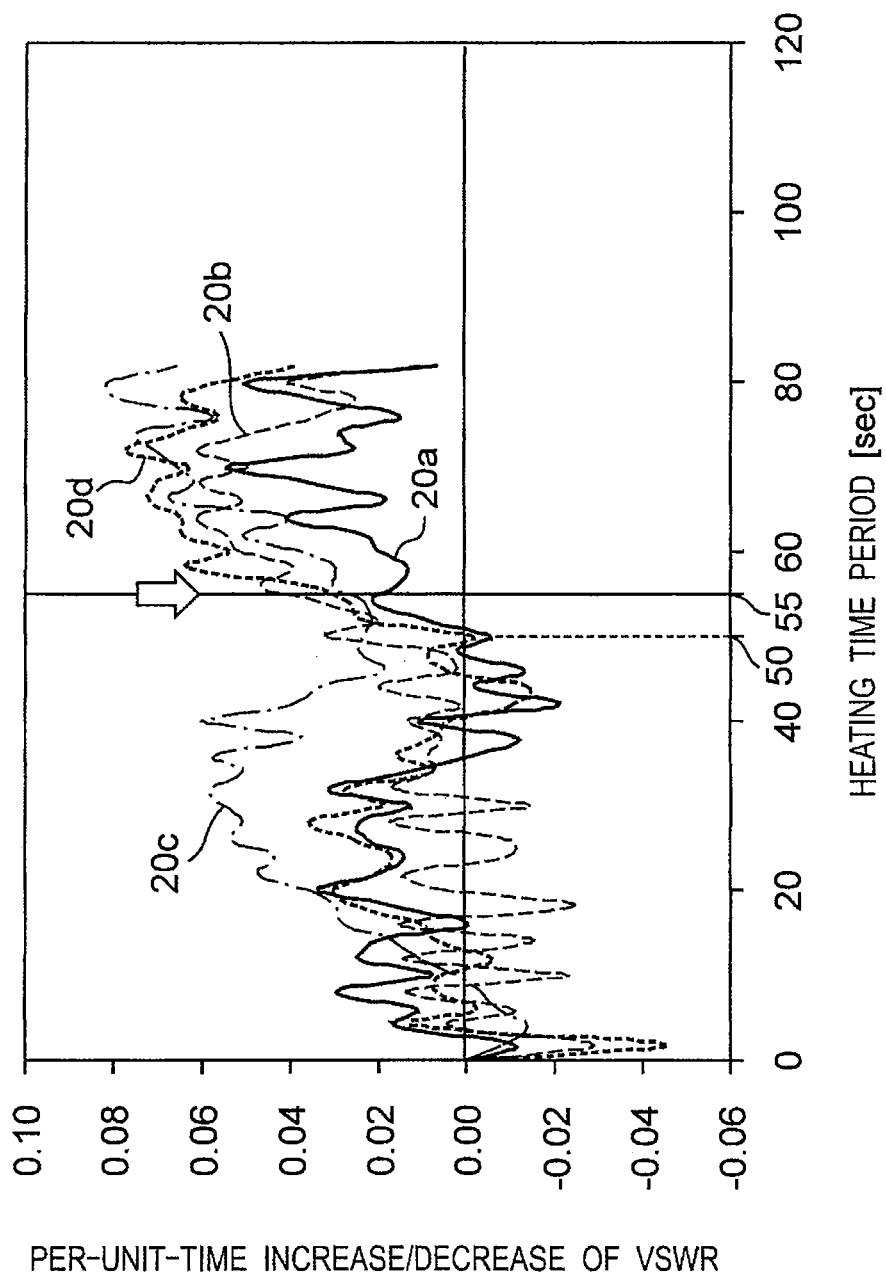
FIG. 13 is a characteristic curve plot for describing control operations in the microwave heating device according to Embodiment 2 of the present invention.

FIG. 12 and FIG. 13 illustrate time-varying characteristics of VSWRs, and per-unit-time increase/decrease change characteristics of VSWRs, which correspond to the time-varying characteristics of the amounts of reflected microwaves in FIG. 10 and the per-unit-time increase/decrease change characteristics of the amounts of reflected microwaves in FIG. 11, respectively, which have been described above. Referring to FIG. 12, the horizontal axis represents the heating time period [sec], while the vertical axis represents the VSWRs calculated based on the amounts of supplied microwaves (sw) and the amounts of reflected microwaves [W] detected by the respective electric-power detection portions 18a, 18b, 18c and 18d.

Further, in FIG. 13, the horizontal axis represents the heating time period [sec], while the vertical axis represents the per-unit-time increases/decreases of the VSWRs. In FIG. 12 and FIG. 13, the time-varying characteristic curves and the increase/decrease change characteristic curves of the VSWRs are designated by the reference numerals of the respective corresponding feeding portions 20a, 20b, 20c and 20d.

Figure 14:
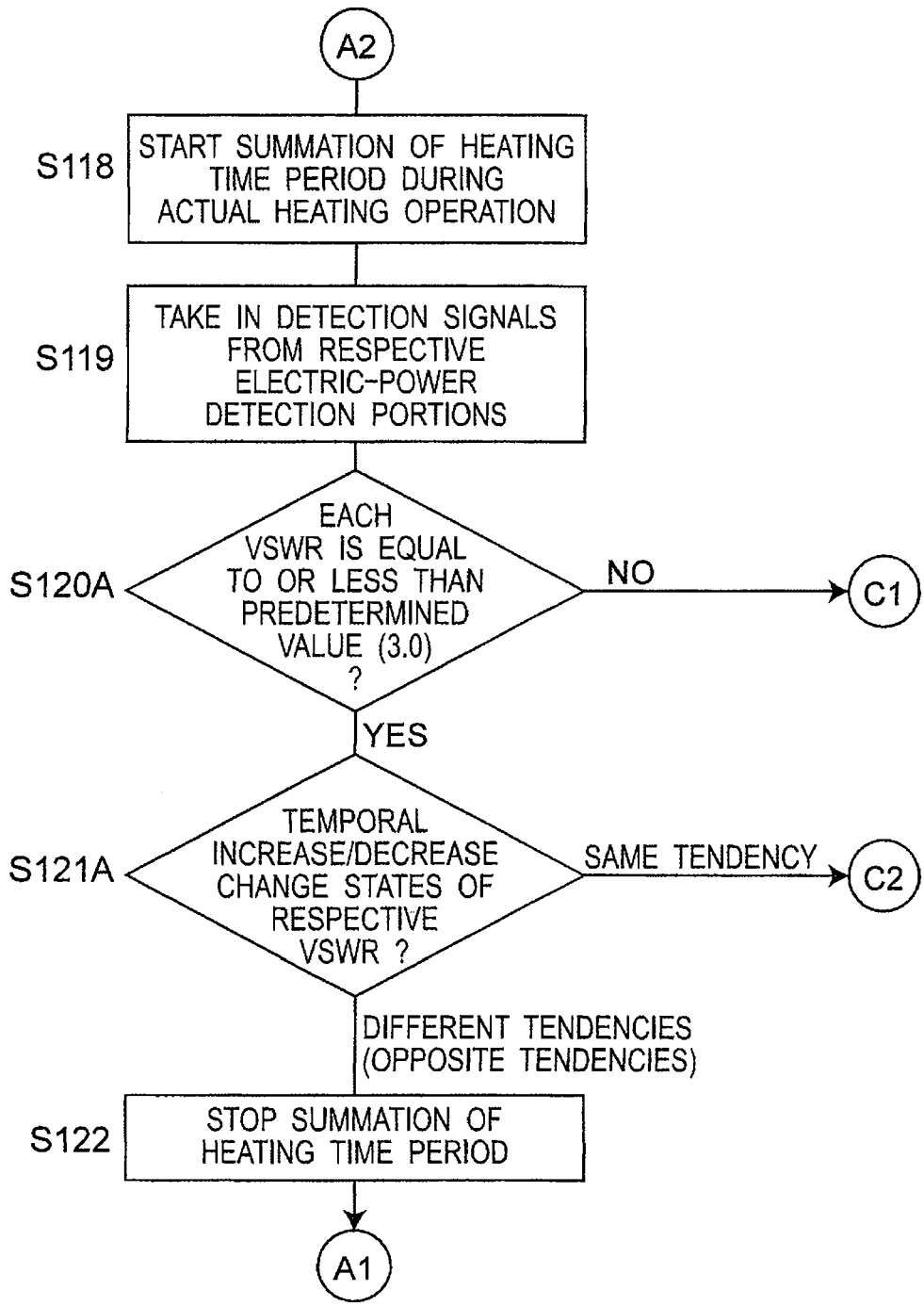
FIG. 14 is a flow chart for describing control operations in the microwave heating device according to Embodiment 2 of the present invention.
Figure 15:
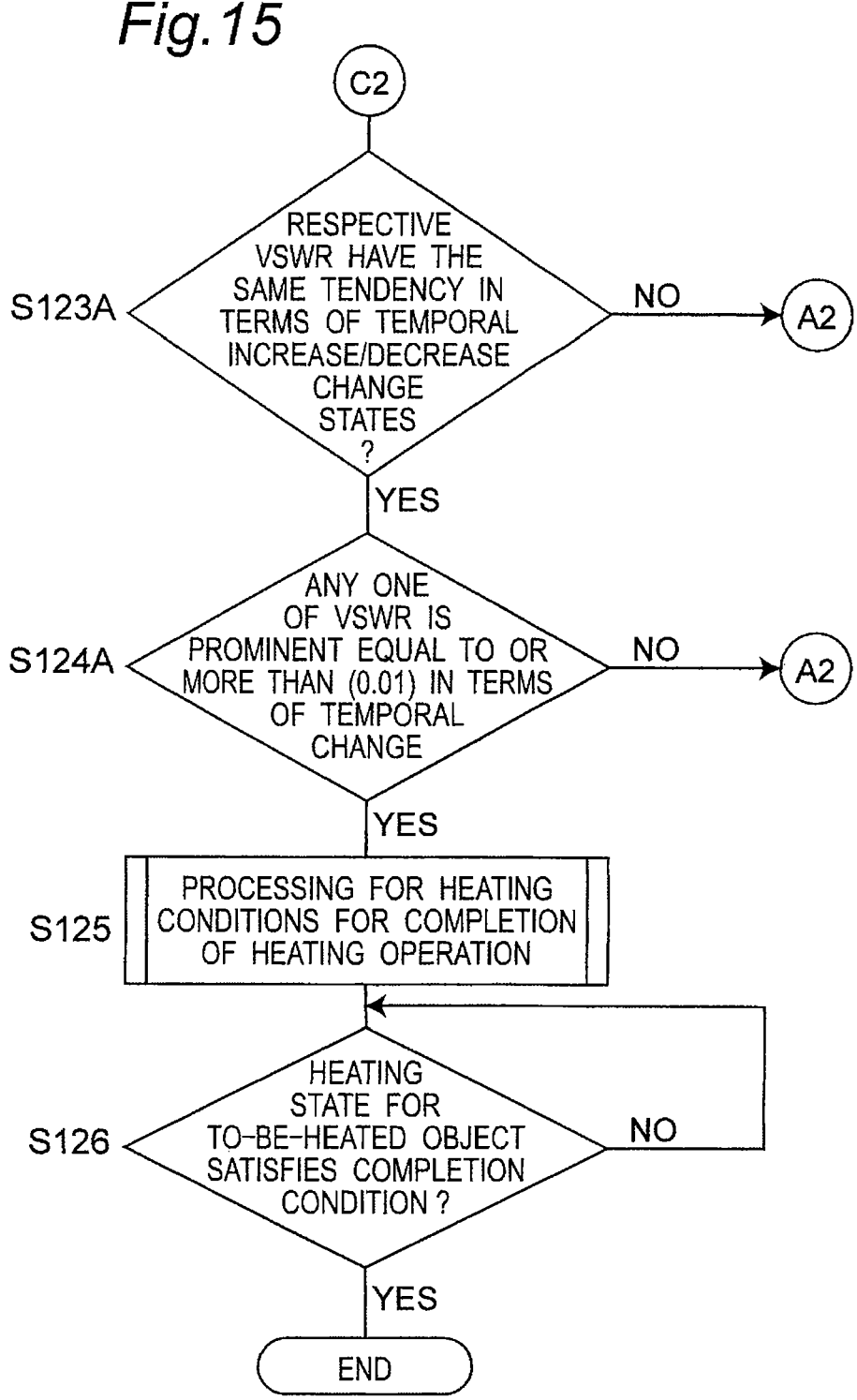
FIG. 15 is a flow chart for describing control operations in the microwave heating device according to Embodiment 2 of the present invention.
Figure 16:
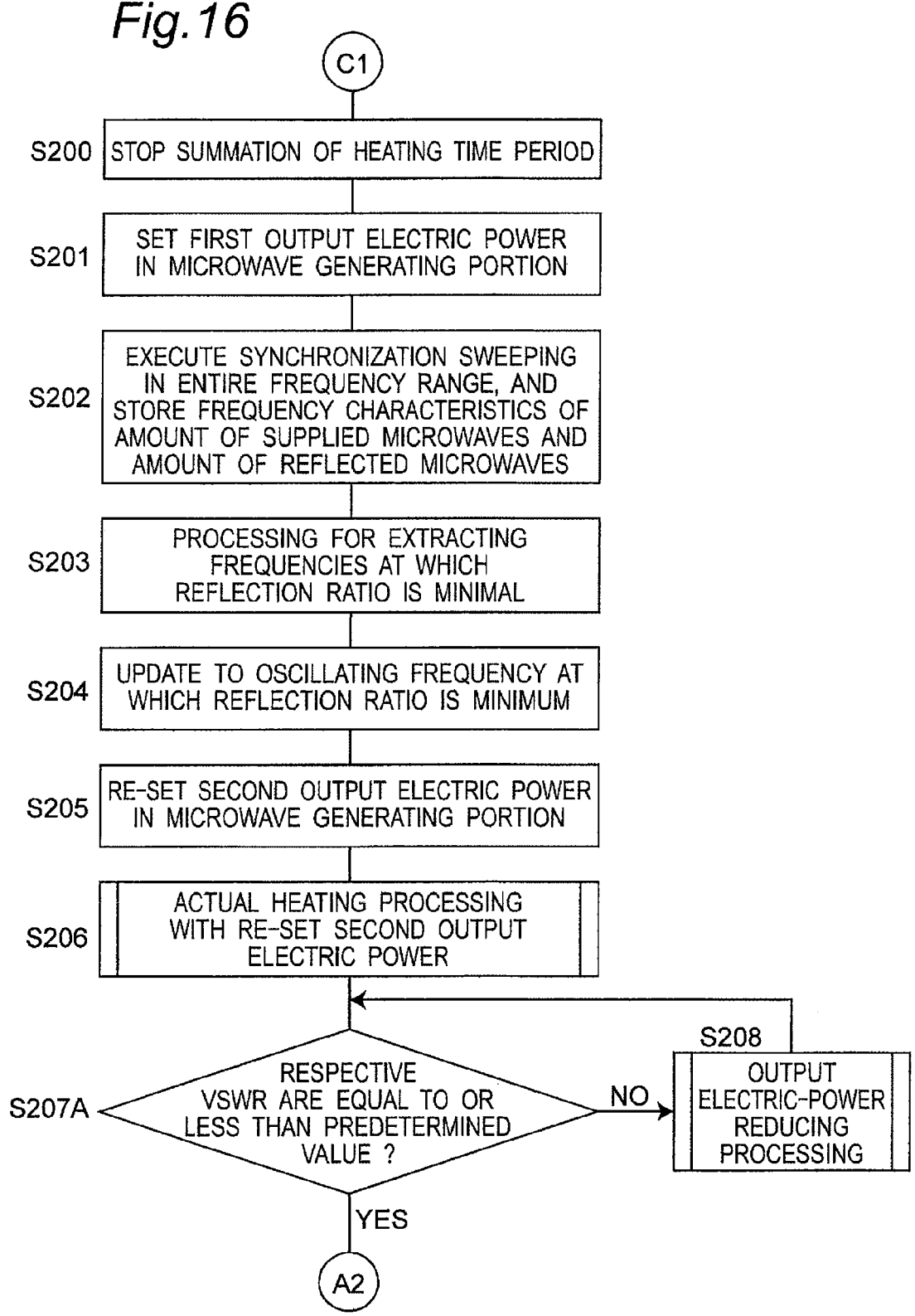
FIG. 16 is a flow chart for describing control operations in the microwave heating device according to Embodiment 2 of the present invention.

FIGS. 14 to 16 illustrate flow charts illustrating the control contents in the microwave heating device according to Embodiment 2, corresponding to the control operations of the flow charts in FIGS. 6 to 8 described in above-described Embodiment 1. The control contents described with reference to FIG. 5 according to Embodiment 1 are similarly executed in Embodiment 2. Hereinafter, the control contents will be described with reference to the flow charts illustrated in FIGS. 14 to 16, along with the characteristic curves in FIG. 12 and FIG. 13.

During actual heating operations in the microwave heating device according to Embodiment 2, the operation proceeds to step S118 illustrated in FIG. 14 for starting the summation of the heating time period during the actual heating operations, and then the operation proceeds to step S119. In step S119, the control portion 21 takes in detection signals corresponding to the amounts of supplied microwaves (sw) and the amounts of reflected microwaves (rw) which have been detected by the respective electric-power detection portions 18a, 18b, 18c and 18d, and then the operation proceeds to step S120A.

In step S120A, the respective VSWRs are calculated based on the amounts of supplied microwaves (sw) and the amounts of reflected microwaves (rw) which have been detected by the respective electric-power detection portions 18a, 18b, 18c and 18d, and it is determined whether any one of the calculated VSWRs has exceeded a predetermined value. Namely, in step S120A, it is checked whether any of the detected VSWRs are equal to or less than the predetermined value. In Embodiment 2, the predetermined value is set to 3.0.

If the respective VSWRs are equal to or less than the predetermined value, the operation proceeds to step S121A. On the other hand, if they have exceeded the predetermined value, the operation proceeds to step S200 (see FIG. 16).

Referring to the VSWR time-varying characteristic curves illustrated in FIG. 12, there is not induced a state where the amounts of reflected microwaves exceeds the predetermined value halfway through the heating. Further, as illustrated in FIG. 12, almost all the time-varying characteristic curves have a tendency to increase. Referring to the VSWR per-unit-time increase/decrease change characteristic curves illustrated in FIG. 13, the detection signals detected by the electric-power detection portion 18b connected to the feeding portion 20b (particularly, in the state where the heating time period is less than 50 seconds) exhibit a property of repeatedly increasing (in the positive region) and decreasing (in the negative region). As described above, in the case where they have such a property of repeatedly increasing and decreasing at short-time intervals and thus having no tendency to increase or decrease continuously with time, the control portion 21 does not determine that these detection signals (20b) have a property of changing with a different tendency (opposite tendency), but temporarily determines that they have a similar tendency rather than the opposite tendency, and thus the control portion 21 continues the heating operation. Further, the operation proceeds from step S121A to step S123A (see FIG. 15). In step S123A, it is determined again whether the respective VSWRs can be certainly determined to have the same tendency, in terms of their per-unit-time increase/decrease change states. If it is determined, in step S123A, that the respective the amounts of reflected microwaves have the same tendency in terms of their temporal increase/decrease change states, the operation proceeds to step S124A. On the other hand, if the respective VSWRs can not be certainly determined to have the same tendency in terms of their temporal increase/decrease change states, in step S123A, the operation returns to step S118 (see FIG. 14).

Accordingly, in the example of the characteristic curves illustrated in FIG. 12 and FIG. 13, the respective steps, which are step S118, step S119 and step S120A in the mentioned order, are executed, in order to carry forward the processing for heating the to-be-heated object B.

Referring to the characteristic curves illustrated in FIG. 13, in the state after the heating time period has reached about 50 seconds, all the VSWRs have a tendency to increase, in terms of temporal increase/decrease changes therein (in the positive region). Accordingly, in this state it is determined, in step S123A, that the amounts of reflected microwaves have the same tendency in terms of their temporal increase/decrease change states, and the operation proceeds to step S124A. In step S124A, it is determined whether or not the per-unit-time increase/decrease changes in the respective VSWRs have been prominent, for example, it is determined whether or not the temporal increase/decrease change in at least one of the VSWRs has been equal to or more than a threshold value as a predetermined determination index. In this case, the threshold value (the degree of prominence) as the prominence determination index is ±0.01. If it is determined, in step S124A, that the temporal increase/decrease change in at least one of the VSWRs has exceeded the determination index, and thus has been prominent, the operation proceeds to step S125. On the other hand, if it is determined, in step S124A, that the temporal increase/decrease changes in the VSWRs have not been prominent, for example, they have been less than ±0.01, the operation returns to step S118 (see FIG. 14) again.

The flow chart in FIG. 16 illustrates the control contents in and after step S200 if the respective VSWRs have exceeded the predetermined value, in step S120A illustrated in FIG. 14.

Referring to FIG. 16, the operations in the respective steps from step S200 to step S206 are the same as the operations described with reference to the flow chart of FIG. 8 according to above-described Embodiment 1.

In step S206 an actual heating operation is started with the second output electric power at the heating frequency updated in step S204, and the operation proceeds to step S207A.

In step S207A it is determined whether the calculated respective VSWRs are equal to or less than the predetermined value (3.0). If the calculated respective VSWRs have not exceeded the predetermined value, the operation returns to step S118 (see FIG. 14). On the other hand, if any of the respective VSWRs has exceeded the predetermined value, the operation proceeds to step S208.

In step S208, an operation for processing for reducing the output electric power of the oscillation portion 11 is performed, as described in Embodiment 1. This output electric-power reducing processing is for gradually reducing the output of the oscillation portion 11, in the case where the second output electric power is 100%, for example, by setting electric power equivalent to 90% thereof as third output electric power, further setting electric power equivalent to 75% thereof as fourth output electric power, and setting electric power equivalent to 50% thereof as fifth output electric power. The output of the oscillation portion 11 is gradually reduced until the respective VSWRs have become equal to or less than a predetermined value (3.0). At the time point when they have become equal to or less than the predetermined value, the operation returns to step S118. Further, when the output of the oscillation portion 11 is the fifth output electric power, which is equivalent to 50% of the second output electric power, if any of the amounts of reflected microwaves has exceeded the predetermined value, the heating operation can be stopped to complete the heating processing.

As described above, the microwave heating device according to Embodiment 2 is adapted to perform controlling operations, based on the amounts of supplied microwaves along with the amounts of reflected microwaves, which enables correction in change of the amounts of supplied microwaves, in the case where the frequency generated from the microwave generating portion has been changed through updating processing and the like. Further, with the microwave heating device according to Embodiment 2, it is possible to check actual operations with respect to the output electric power reducing processing in step S208, which enables estimation of, more certainly, the state changes along with the heating of the to-be-heated object.

Figure 17:
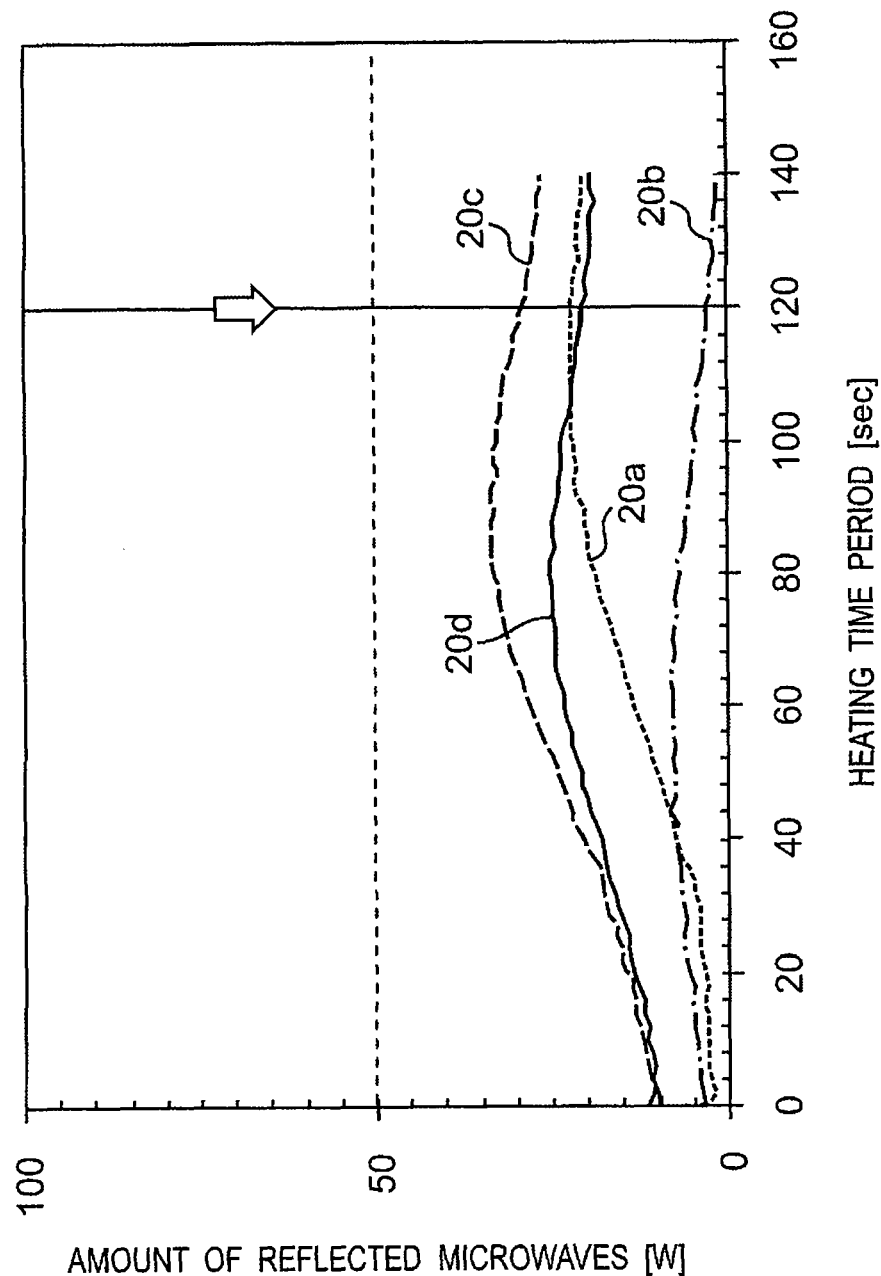
FIG. 17 is another characteristic curve plot for describing control operations in the microwave heating device according to Embodiment 2 of the present invention.
Figure 18:
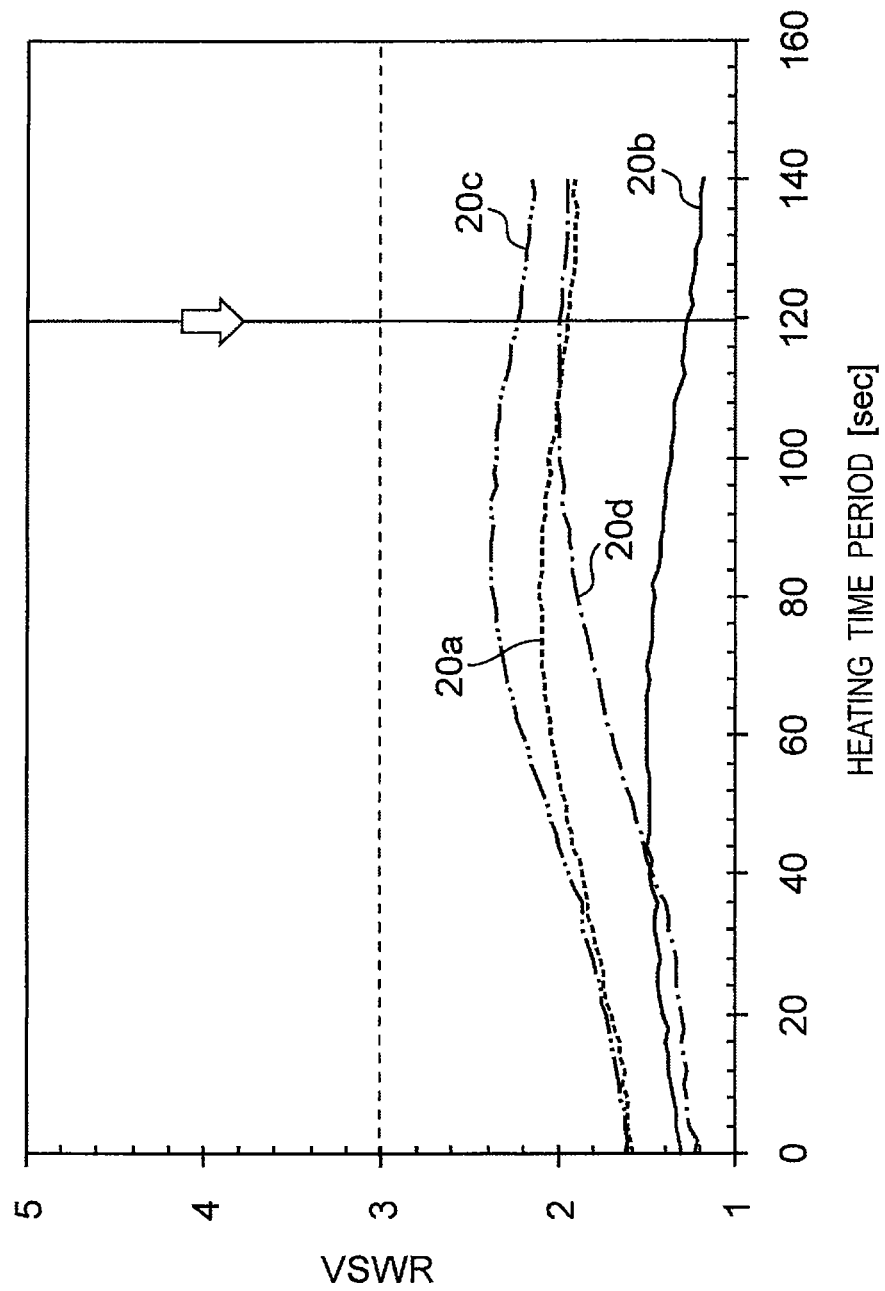
FIG. 18 is another characteristic curve plot for describing control operations in the microwave heating device according to Embodiment 2 of the present invention.
Figure 19:
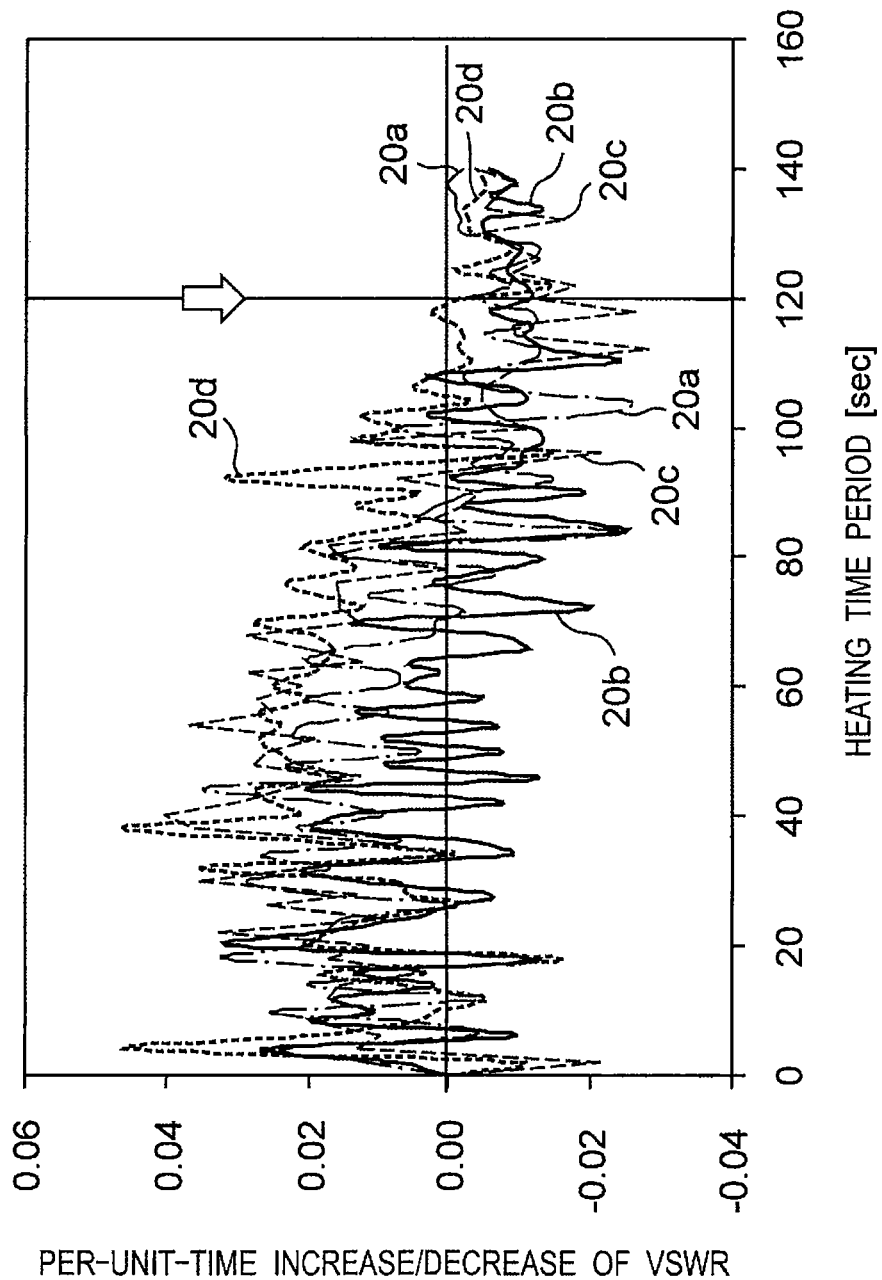
FIG. 19 is another characteristic curve plot for describing control operations in the microwave heating device according to Embodiment 2 of the present invention.

Next, FIGS. 17 to 19 illustrate, as another example of heating, exemplary characteristic curves resulted from use of a to-be-heated object C, which are different from the characteristic curves in FIG. 10 and FIG. 11 employed in Embodiment 1 and the characteristic curves in FIG. 12 and FIG. 13 employed in Embodiment 2.

FIG. 17 is an example of time-varying characteristic curves of the amounts of reflected microwaves resulted from actual heating processing on a certain to-be-heated object C, with the microwave heating device according to above-described Embodiment 1. Referring to FIG. 17, the horizontal axis represents the heating time period [sec], while the vertical axis represents the amounts of reflected microwaves [W] detected by the respective electric-power detection portions 18a, 18b, 18c and 18d.

In the example of the characteristic curve illustrated in FIG. 17, there is illustrated a case where the respective amounts of reflected microwaves are equal to or less than the predetermined value (50 W), in step S120 in the flow chart in FIG. 6, and therefore the actual heating operation is continued at the heating frequency (f1) set in step S115 (FIG. 5).

FIG. 18 illustrates an example of time-varying characteristic curves of the VSWRs resulted from actual heating processing on the to-be-heated object C with the microwave heating device according to above-described Embodiment 2, wherein FIG. 18 corresponds to FIG. 17. Referring to FIG. 18, the horizontal axis represents the heating time period [sec] while the vertical axis represents VSWRs based on the amounts of supplied microwaves and the amounts of reflected microwaves detected by the respective electric-power detection portions 18a, 18b, 18c and 18d. FIG. 19 is an example of increase/decrease change characteristic curves representing per-unit-time changes based on the VSRW time-varying characteristics in FIG. 18. Further, in FIG. 19 the horizontal axis represents the heating time period [sec] while the vertical axis represents the per-unit-time increase/decreases of the VSWRs.

The characteristic curves illustrated in FIG. 18 represent a case where the respective VSWRs are equal to or less than the predetermined value (3.0) in step S120A in the flow chart in FIG. 14, and, therefore, the actual heating operation is continued with the set heating frequency.

Further, FIG. 19 illustrates increase/decrease change characteristic curves representing the changes in the per-unit-time increase/decrease states of the respective VSWRs, resulted from an actual heating operation on the to-be-heated object C. From these increase/decrease change characteristic curves of the VSWRs, their tendencies in terms of temporal increase/decrease changes are determined.

As described in Embodiment 2, the increase/decrease change characteristics illustrated in FIG. 19 are utilized, in the determination operations in step S120A and step S121A in the flow chart in FIG. 14 and in step S123A and step S124A in the flow chart in FIG. 15. Referring to the increase/decrease change characteristic curves illustrated in FIG. 19, after the heating time period has reached about 120 seconds, all the VSWRs have a tendency to decrease (in the negative region), in terms of their per-unit-time increase/decrease change states. Accordingly, the control portion 21 determines that all the VSWRs have a tendency to decrease (in the negative region), in terms of their per-unit-time increase/decrease change states (step S123A) and, then, in step S124A, it determines whether or not the temporal increase/decrease change in any one of the VSWRs has been prominent (equal to or more than 0.01). If the temporal increase/decrease change in any one of the VSWRs has been prominent, processing for various types of heating conditions required for the completion of the heating operation in step S125 is performed. If the heating state for the to-be-heated object C is determined to satisfy the completion condition in step S126, the heating operation on the to-be-heated object C is completed.

As described above, the microwave heating device according to the present invention is adapted to detect temporal increase/decrease changes in the amounts of reflected microwaves acquired from the respective electric-power detection portions associated with the plural feeding portions and, further, is adapted to perform processing for determining whether or not any one of the amounts of reflected microwaves is different from the other amounts of reflected microwaves in terms of temporal increase/decrease changes therein, which enables certainly estimation of uniformity of the heating distribution for the to-be-heated object. In the microwave heating device according to the present invention, if it is estimated that the heating state is such that the heating distribution for the to-be-heated object is nonuniform, based on the temporal increase/decrease changes in the amounts of reflected microwaves as described above, the heating frequency in the microwave generating portion is immediately updated to change the microwave distribution within the heating chamber, thereby facilitating uniform heating of the to-be-heated object.

Such a phenomenon that any one of the amounts of reflected microwaves is different from the other amounts of reflected microwaves in terms of temporal increase/decrease changes therein indicates that the microwave electric power received by the corresponding feeding portion has prominently increased or decreased in comparison with the microwave electric power received by the other feeding portions. Accordingly, it is suggested that microwave losses have decreased or increased around this corresponding feeding portion and, therefore, it is determined that the to-be-heated object has been locally heated or the heating temperature therearound is lower in comparison with areas around the other feeding portions.

Further, the microwave heating device according to the present invention is adapted to estimate the heating state for the to-be-heated object, based on temporal increase/decrease changes in all the amounts of reflected microwaves. With the microwave heating device according to the present invention, if all the amounts of reflected microwaves have the same tendency in terms of their increase/decrease states, it is determined that the to-be-heated object is being uniformly heated and, further, if they have been prominently increased or decreased to be changed with the same tendency, it is determined that the to-be-heated object has began to largely change in physical values. Namely, in a state where the to-be-heated object is being heated, if the temperature reaches a temperature range within which water vaporization begins to actively occur, microwaves intrude into the to-be-heated object to a larger depth. If microwaves thus intrude into the to-be-heated object to a larger depth, these microwaves begin to penetrate through the to-be-heated object in the case where the to-be-heated object has a smaller size, and these microwaves are less reflected by the surface of the to-be-heated object when the to-be-heated object has a larger size. In such states, each feeding portion in the heating chamber directly receives, at a higher rate, microwaves radiated from the other feeding portions, and the reflection thereof on the surface of the to-be-heated object is reduced, thereby decreasing the amounts of reflected microwaves received by the respective feeding portions. Accordingly, at the timing when the amounts of reflected microwaves detected by the respective electric-power detection portions prominently have the same tendency, it is estimated that the to-be-heated object has been heated to a temperature within the range of 60° C. to 70° C. In general, if the temperature of the to-be-heated object reaches the range of 60° C. to 70° C., it can be estimated that the heating cooking for the to-be-heated object has been nearing to a completion state. Accordingly, it is possible to recognize, on receiving the result of this estimation, that the heating cooking for the to-be-heated object has been nearing to the end and, also, it is possible to determine the timing of the completion of the heating operation and to suppress excessive heating of the to-be-heated object. The timing of the completion of the heating operation can be determined by, for example, calculating the time period for which the heating should be continued, based on the time period elapsed since the start of the heating, and by determining the completion time, in cases of defining the time point when the temperature of the to-be-heated object has reached 75° C. as being the completion of heating. Further, when the completion time has been reached after the elapse of the heating continuation time period, the operation of the microwave generating portion can be stopped to thereby bring the to-be-heated object into a desired preferably-finished state. Further, with the microwave heating device according to the present invention, it is possible to complete the heating operation when the temperature of the to-be-heated object is appropriate, which can reduce extra electric power consumption.

In the microwave heating device according to the present invention, the plural feeding portions are placed on the same wall surface which forms the heating chamber such that they are symmetrical about an approximate center of this wall surface. This enables radiation of microwaves, in different directions, from the plural feeding portions placed symmetrically about a point, for the to-be-heated object placed at the center of the heating chamber and, also, enables the feeding portions to receive reflected waves in different directions. Further, the microwave heating device according to the present invention is adapted to make comparisons among the amounts of reflected microwaves received by the respective feeding portions, which enables certainly grasp of the uniformity of the heating of the to-be-heated object, thereby enabling estimation of the uniformity state of the heating with higher accuracy.

Further, with the microwave heating device according to the present invention, it is possible to utilize the amounts of supplied microwaves detected by the electric-power detection portion, for correcting the changes in the amounts of supplied microwaves when the oscillation frequency has been changed, in processing for updating the oscillating frequency generated from the microwave generating portion, and the like, which enables estimation of, more certainly, the state changes along with heating of the to-be-heated object.

With the microwave heating device according to the present invention, during the execution of heating of the to-be-heated object with the oscillating frequency selected through sweeping operations before the start of the actual heating operation, if the amounts of reflected microwaves exceed a predetermined value, a sweeping operation for selecting an oscillating frequency for heating the to-be-heated object is executed again, antecedently to the estimation of the heating-distribution state and the heating state for the to-be-heated object. The heating frequency for this to-be-heated object is updated to a newly-selected oscillating frequency, and heating operations on the to-be-heated object are executed. As described above, with the microwave heating device according to the present invention, it is possible to perform heating operations with an appropriately-selected oscillating frequency, which can suppress thermal destructions of the components in the microwave generating portion due to microwave electric power reflected toward the microwave generating portion and, also, can maximize the amount of microwave electric power supplied to the to-be-heated object, thereby reducing the time period and the electric power required for the heating operations.

INDUSTRIAL APPLICABILITY

As described above, with the microwave heating device according to the present invention, it is possible to provide an apparatus capable of uniformly heating a to-be-heated object in a desired state, based on information on reflected waves received by respective plural feeding portions provided therein. Therefore, the present invention can be applied to heating devices utilizing inductive heating as represented by microwave ovens, and other various types of applications such as disposers, semiconductor fabrication devices, drying devices.

The invention claimed is:

1. A microwave heating device comprising:
 a microwave generating portion having a variable frequency function;
 a heating chamber for housing an object to be heated;
 a plurality of feeding portions that supplies the heating chamber with a microwave generated from the microwave generating portion and comprising a first feeding portion and a second feeding portion;
 a plurality of electric-power detection portions that detects an amount of reflected microwaves which are reflected toward the microwave generating portion from the heating chamber through each of the feeding portions; and
 a control portion that selects a heating frequency of the microwave generated from the microwave generating portion based on the amount of reflected microwaves detected by the electric-power detecting portions, the control portion operable to control an operation of the microwave generating portion; wherein
 the control portion is operable to:
 receive the amount of reflected microwaves for each feeding portion;
 determine a temporal change in the amount of reflected microwaves, wherein the temporal change indicates an increase or a decrease of the amount of reflected microwaves per unit period time and comprises a first temporal change in connection with the first feeding portion and a second temporal change in connection with the second feeding portion;

compare the amount of reflected microwaves for each feeding portion with a first predetermined threshold;
upon determination that the amount of reflected microwaves for each feeding portion is less than the first predetermined threshold, determine whether each temporal change for each feeding portions shows the same tendency, or different tendencies, wherein the different tendencies indicate that one of the first temporal change and the second temporal change is increasing and the other is decreasing;
upon determination that each temporal change for each feeding portion shows the same tendency, determine whether at least one of temporal changes is equal or more than a second predetermined threshold; and
upon determination that at least one of temporal changes is equal or more than the second predetermined threshold, process a plurality of heating conditions required for completion of the heating operation.

2. The microwave heating device according to claim 1, wherein
the respective feeding portions are placed on the same wall surface forming the heating chamber, symmetrically about a center of the wall surface.

3. The microwave heating device according to claim 1, wherein:
the control portion further operates to select a different heating frequency, upon determination that the amount of reflected microwaves detected at one or more of the electric-power detection portions have exceeded the first predetermined threshold.

4. The microwave heating device according to claim 1, wherein:
upon determination that each temporal change for each feeding portions shows the different tendencies, the control portion further operates to select a different heating frequency.

5. The microwave heating device according to claim 1, wherein:
upon determination that each temporal change for each feeding portions shows the same tendency, the control portion operates to continue an actual heating operation.

6. The microwave heating device according to claim 1, wherein:
the plurality of heating conditions required for completion of the heating operation comprises that the temperature of the object to be heated falls within the range of 60° C. to 70° C.

* * * * *